(12) United States Patent
Marumoto et al.

(10) Patent No.: US 8,147,369 B2
(45) Date of Patent: Apr. 3, 2012

(54) TRACTION-DRIVE TYPE DRIVING-FORCE TRANSMISSION MECHANISM AND IMAGE FORMING APPARATUS EQUIPPED THEREWITH

(75) Inventors: Takeshi Marumoto, Osaka (JP); Kiyohide Okamoto, Osaka (JP)

(73) Assignee: Kyocera Mita Corporation (JP)

( * ) Notice: Subject to any disclaimer, the term of this patent is extended or adjusted under 35 U.S.C. 154(b) by 673 days.

(21) Appl. No.: 12/270,085

(22) Filed: Nov. 13, 2008

(65) Prior Publication Data

US 2009/0131212 A1 May 21, 2009

(30) Foreign Application Priority Data

| Nov. 13, 2007 | (JP) | 2007-294294 |
| Nov. 13, 2007 | (JP) | 2007-294295 |
| Nov. 13, 2007 | (JP) | 2007-294296 |
| Nov. 13, 2007 | (JP) | 2007-294297 |
| Nov. 13, 2007 | (JP) | 2007-294298 |
| Nov. 13, 2007 | (JP) | 2007-294299 |
| Nov. 13, 2007 | (JP) | 2007-294300 |
| Jun. 6, 2008 | (JP) | 2008-148941 |
| Jun. 6, 2008 | (JP) | 2008-148942 |

(51) Int. Cl.
*F16H 13/06* (2006.01)
*G03G 15/00* (2006.01)

(52) U.S. Cl. ............ 475/197; 399/167

(58) Field of Classification Search .......... 475/183, 475/197; 476/65, 66, 68, 72; 399/167, 302, 399/308
See application file for complete search history.

(56) References Cited

U.S. PATENT DOCUMENTS

| 3,207,004 | A | * | 9/1965 | Chery ............... 475/197 |
| 4,802,386 | A | * | 2/1989 | Haack ............... 475/197 |
| 5,025,671 | A | * | 6/1991 | Kraus ............... 475/195 |
| 5,584,774 | A | * | 12/1996 | Fini, Jr. ............. 475/183 |
| 6,652,413 | B2 | * | 11/2003 | Nanbu et al. ........... 476/73 |
| 7,756,448 | B2 | * | 7/2010 | Marumoto ............. 399/167 |
| 2006/0140684 | A1 | | 6/2006 | Matayoshi |

FOREIGN PATENT DOCUMENTS

| CN | 1797227 | 7/2006 |
| JP | 2000-329206 | 11/2000 |
| JP | 2006-161880 | 6/2006 |

\* cited by examiner

*Primary Examiner* — Roger Pang
(74) *Attorney, Agent, or Firm* — Gerald E. Hespos; Michael J. Porco

(57) ABSTRACT

A traction-drive type driving-force transmission mechanism includes an output shaft and a sun roller that is rotatable about a first central axis. Shafts having respective second central axes are disposed respectively on corresponding secondary axes, of which is inclined relative to the first central axis in such a manner that each second central axis is aligned with the corresponding secondary axis. A pressing member is coupled to the output shaft. A plurality of speed-reduction rollers are disposed along an outer peripheral surface of the sun roller and are supported by the respective shafts. The pressing member presses each of the speed-reduction rollers against the outer peripheral surface of the sun roller to allow a driving force to be transmitted by a traction force between the sun roller and the speed-reduction roller.

23 Claims, 27 Drawing Sheets

TRACTION-DRIVE TYPE DRIVING-FORCE TRANSMISSION MECHANISM AND IMAGE FORMING APPARATUS EQUIPPED THEREWITH

BACKGROUND OF THE INVENTION

1. Field of the Invention

The present invention relates to a traction-drive type driving-force transmission mechanism capable of transmitting a driving force or reducing a rotational speed, through means of a traction force generated between rollers, and an image forming apparatus equipped with the traction-drive type driving-force transmission mechanism.

2. Description of the Related Art

As a conventional technique relating to traction-drive type driving-force transmission mechanisms, there has been known a mechanism which comprises a sun roller coupled to a rotary shaft, a plurality of planetary rollers arranged around the sun roller, and a carrier supporting respective planetary shafts of the planetary rollers (see, for example, JP 2000-329206A, which will hereinafter be referred to as "document D1"). The mechanism disclosed in the document D1 is designed such that each of the planetary rollers is rotated through means of a traction force generated between the sun roller and each of the planetary rollers, and a movement of each of the planetary rollers orbited around the sun roller along a pair of orbit rings is transmitted from the carrier to an output shaft.

In order to generate a sufficient traction force between the sun roller and each of the planetary rollers, it is necessary to strongly press the planetary roller against the sun roller (i.e., bring the planetary roller into press contact with the sun roller) in the presence of a lubricant while rotatably supporting the planetary roller by the corresponding planetary shaft. For this purpose, in the mechanism disclosed in the document D1, the planetary shaft and the planetary roller are formed and arranged to ensure a certain gap therebetween, and the pair of orbit rings are disposed to sandwich therebetween the planetary roller in such a manner that an inclined surface formed in an inner periphery of each of the orbit rings is brought into press contact with an inclined portion (inclined surface) formed on each of axially opposite lateral sides of the planetary roller, to allow the planetary roller to be pressed against an outer peripheral surface of the sun roller.

In the mechanism disclosed in the document D1, each of the planetary rollers is adapted to be freely displaceable relative to the planetary shaft within the range of the gap, although the planetary shaft is fixed to the carrier. Thus, when the orbit rings are brought into press contact with the respective inclined surfaces of the planetary rollers, the planetary rollers will be strongly pressed against the sun roller, so that a required traction force can be generated in the presence of a lubricant.

However, the mechanism disclosed in the document D1 requires using the two orbit rings made of a costly material, such as tool steel, and the resulting increase in material cost will lead directly to an increase in product cost. Moreover, due to an increase in the number of components requiring high-accuracy assembling, such as the orbit rings, an assembling process becomes complicated, which leads to a problem about an increase in production cost.

Further, in the mechanism disclosed in the document D1, the planetary shaft and the planetary roller are arranged to define a gap therebetween. This technique involves a possibility that a rotation axis (rotation central axis) of the planetary roller is displaced at a certain amount of angle with respect to an axis (central axis) of the planetary shaft. Thus, when the planetary roller is pressed against the sun roller, an outer peripheral surface of the planetary roller is likely to be slightly inclined relative to the outer peripheral surface of the sun roller. In this case, a pressure distribution on the outer peripheral surface of the planetary roller becomes uneven in an axial direction of the planetary roller, and thereby so-called "edge contact" occurs to cause uneven wear (i.e., partial or local wear) on the outer peripheral surface of the sun roller.

Further, the planetary rollers in the document D1 are built in a casing-side subassembly including the output shaft and a pressing member (orbit rings) but not in a drive-side subassembly including the sun roller. Thus, in an operation of assembling the casing-side subassembly and the drive-side subassembly, the sun roller is inserted into the casing-side subassembly to bring the outer peripheral surface thereof into contact with the respective outer peripheral surfaces of the planetary rollers, and then further slidingly moved inside the casing-side subassembly while maintaining the contact. This operation is also likely to cause scratch or abrasion on the sun roller and the planetary rollers. Thus, the technique disclosed in the document D1 involves a problem of being unable to obtain a long-lifetime traction-drive type driving-force transmission mechanism.

SUMMARY OF THE INVENTION

It is an object of the present invention to provide a traction-drive type driving-force transmission mechanism capable of facilitating an assembling operation and usable until a lifetime limit of an apparatus equipped therewith.

In order to achieve this object, according to one aspect of the present invention, there is provided a traction-drive type driving-force transmission mechanism, which comprises: an output shaft; a sun roller having a first central axis and being rotatable about the first central axis; a plurality of shaft members having respective second central axes and being disposed respectively on corresponding ones of a plurality of secondary axes each inclined relative to the first central axis by a predetermined angle, in such a manner that each of the second central axes is aligned with the corresponding secondary axis; a plate member which holds each of the shaft members in the posture inclined by the predetermined angle; a plurality of speed-reduction rollers each disposed along an outer peripheral surface of the sun roller while being supported by a corresponding one of the shaft members; and a pressing member coupled to the output shaft, and adapted to press each of the speed-reduction rollers against the outer peripheral surface of the sun roller to allow a driving force to be transmitted through means of a traction force between the sun roller and the speed-reduction roller.

According to another aspect of the present invention, there is provided an image forming apparatus, which comprises: an image forming section including at least a photosensitive drum, or a photosensitive drum and an intermediate transfer belt; a driving source operable to generate a driving force for driving the photosensitive drum, or at least one of the photosensitive drum and the intermediate transfer belt; and a traction-drive type driving-force transmission mechanism operable to transmit the driving force of the driving source to a rotary shaft of the photosensitive drum, or a driving member of the intermediate transfer belt. The traction-drive type driving-force transmission mechanism includes the above feature.

DETAILED DESCRIPTION OF THE PREFERRED EMBODIMENTS

With reference to the drawings, the present invention will be specifically described based on several embodiments thereof.

First Embodiment

Figure 1:
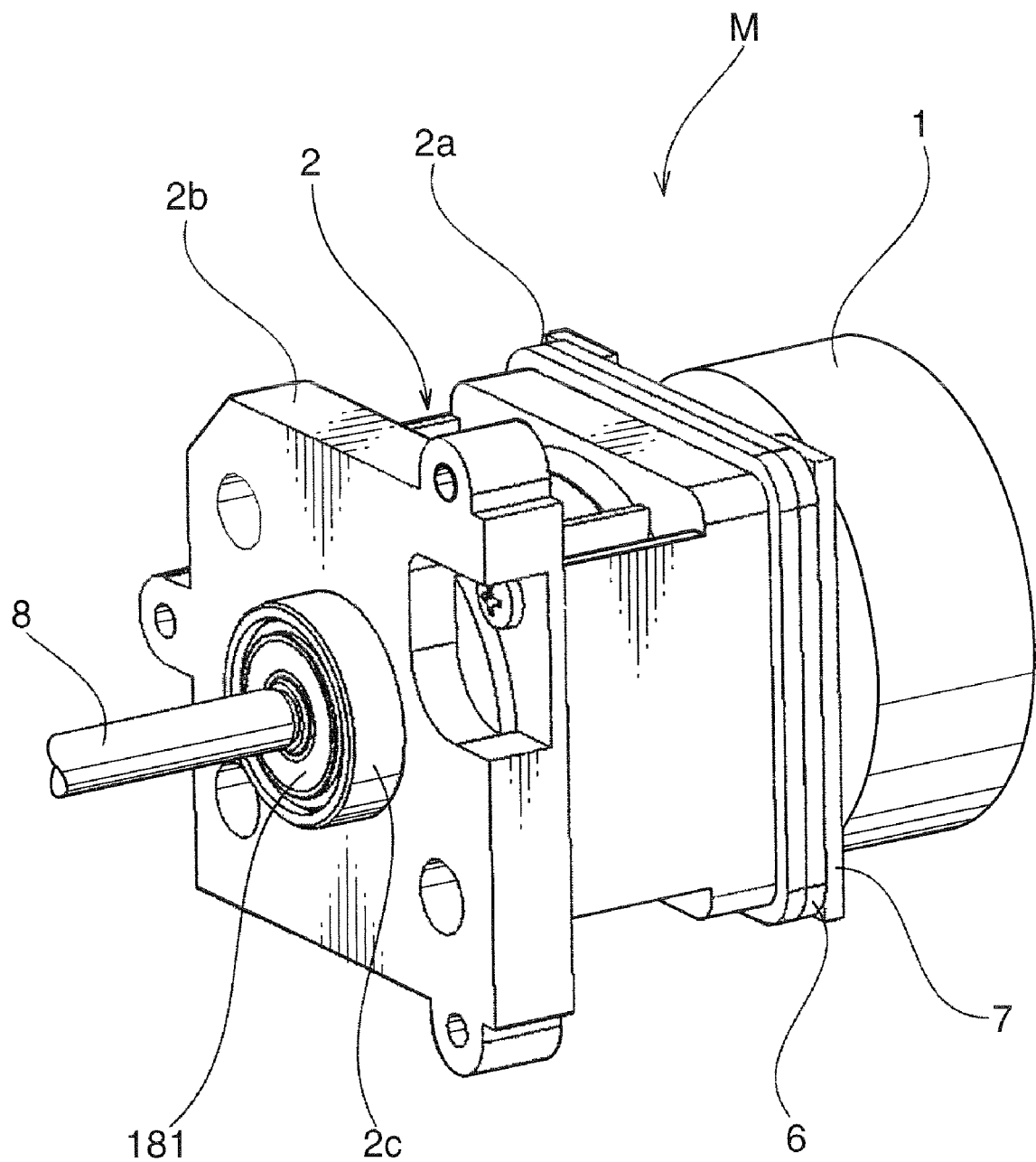
FIG. 1 is a perspective view showing an external appearance of a traction-drive type driving-force transmission mechanism according to a first embodiment of the present invention.

FIG. 1 is a perspective view showing an external appearance of a traction-drive type driving-force transmission mechanism M according to a first embodiment of the present invention. The first embodiment shows one example where a traction-drive type driving-force transmission mechanism M is a speed reducer designed to reduce a rotational speed of a driving force output from a motor 1 (rotational driving source).

The traction-drive type driving-force transmission mechanism M comprises a cylindrical-shaped casing 2, an end plate 6 (plate member), a bearing plate 7, and an output shaft 8. The casing 2 has one end (first end) formed with a rectangular-shaped flange 2a conformable to the end plate 6, and the first end of the casing 2 is closed by the end plate 6. The other end (second end) of the casing 2 on an opposite side of the first end is formed with a rectangular-shaped flange 2b. The traction-drive type driving-force transmission mechanism M is coupled to a motor 1 (driving source) through the end plate 6 and the bearing plate 7.

Figure 2:
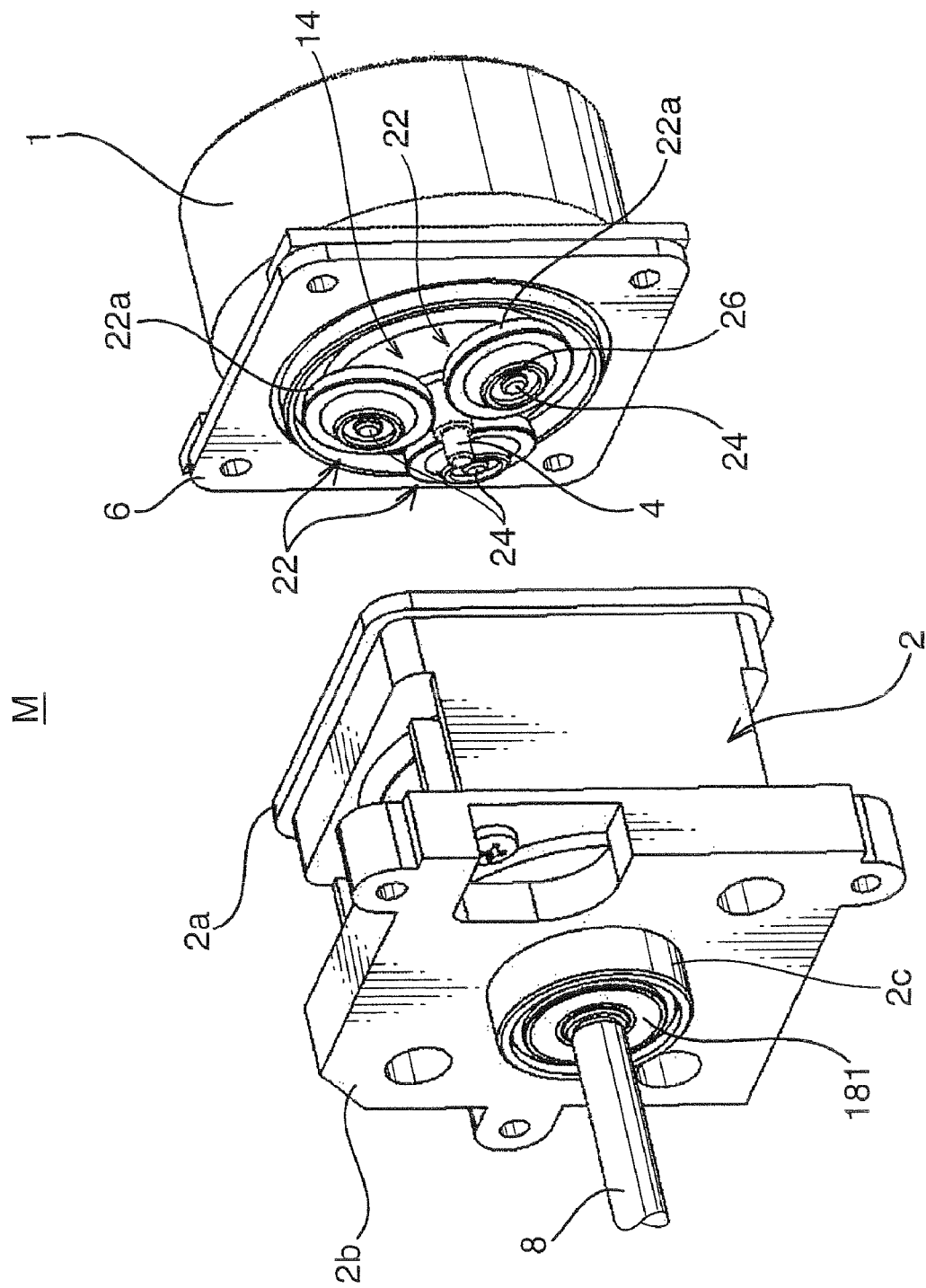
FIG. 2 is a perspective view of the traction-drive type driving-force transmission mechanism in FIG. 1, in a state after being disassembled into two parts.

A sun roller 4 serving as an input shaft of a driving force is disposed such that one end (distal end) thereof is received inside the casing 2 (see FIG. 2). The sun roller 4 is supported rotatably about a central axis (first central axis) thereof, and coupled to a rotary output shaft of the motor 1. The bearing plate 7 is attached to the end plate 6, and the motor 1 is disposed in opposed relation to the bearing plate 7 and the end plate 6. The casing 2 is internally filled with a lubricant (e.g., grease), and a first bearing 17 (see FIG. 11) is formed and arranged to seal the grease filling the inside of the casing 2, while rotatably supporting the sun roller 4.

The output shaft 8 is disposed on an opposite side of the sun roller 4 to protrude from the inside of the casing 2. More specifically, the flange 2b has a boss portion 2c formed in a central region thereof, and a second bearing 181 is mounted on an inner surface of the boss portion 2c. The output shaft 8 is supported by the flange 2b and the casing 2 through the second bearing 181 and a third bearing 182 (see FIG. 11) mounted on an inner wall surface of the casing 2. Each of the second and third bearings 181, 182 is formed and arranged to rotatably support the output shaft 8, and seal the grease filling the inside of the casing 2.

FIG. 2 is a perspective view of the traction-drive type driving-force transmission mechanism M in FIG. 1, in a state after being disassembled into two parts. As shown in FIG. 2, the traction-drive type driving-force transmission mechanism M comprises a drive-side subassembly (including the motor 1) and a casing-side subassembly, wherein the end plate 6 and three speed-reduction rollers 22 are incorporated in the driving source-side subassembly, and a an outer ring 10 (pressing member) and one compression coil spring 13 (see FIG. 11) are incorporated in the casing-side subassembly.

Each of the three speed-reduction rollers 22 is disposed around the sun roller 4 in an inclined posture, while being rotatably supported by a corresponding one of three shaft members 24 through two bearings 26 ("first bearing" set forth in the appended claims). Each of the shaft members 24 is supported by the end plate 6 through a support plate 14. Each of the speed-reduction rollers 22 is adapted to be rotated about the shaft member 24 without being orbitally moved around the sun roller 4.

Figure 3:
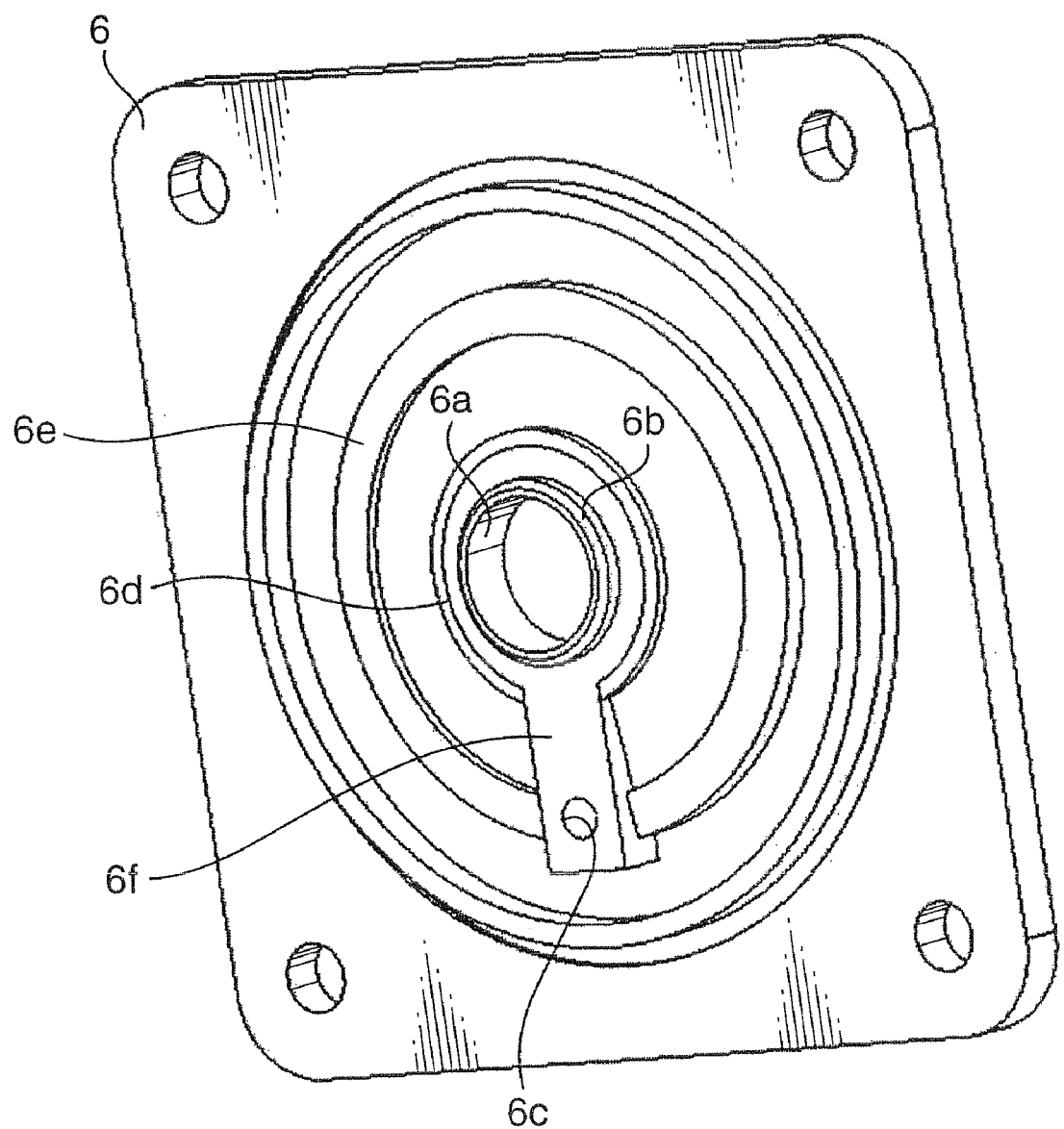
FIG. 3 is a perspective view showing an end plate.

FIG. 3 is a perspective view of the end plate 6 itself. For example, the end plate 6 is formed by press working, using a resin material for chassis members, or the like. The end plate 6 has a hole 6a formed in a central region thereof to allow the sun roller 4 to be penetratingly inserted thereinto. The end plate 6 also has an annular-shaped positioning portion 6b formed on a radially outward side relative to the hole 6a to protrude toward the output shaft 8.

Further, the end plate 6 has two annular-shaped support portions 6d, 6e each formed on a radially outward side relative to the positioning portion 6b to protrude toward the output shaft 8. Specifically, the two support portions 6d, 6e are formed in radially spaced-apart relation to each other by a distance allowing each of the shaft members 24 to be supported therebetween. The support portion 6d located adjacent to the hole 6a is formed to protrude toward the output shaft 8 by a distance greater than that of the support portion 6e located on a radially outward side relative to the support portion 6d. Each of the support portions 6d, 6e has a top surface formed as an inclined surface which becomes gradually lower (i.e., becomes gradually farther from the output shaft 8) in a radially outward direction relative to the hole 6a. For example, an inclination angle $\alpha$ of the top surface is set at about 10 degrees. Furthermore, the end plate 6 has a strip-shaped extension portion 6f extending radially outwardly from a part of an outer peripheral wall of the positioning portion 6b. The extension portion 6f has a distal end region formed with a fixing hole 6c.

Figure 4:
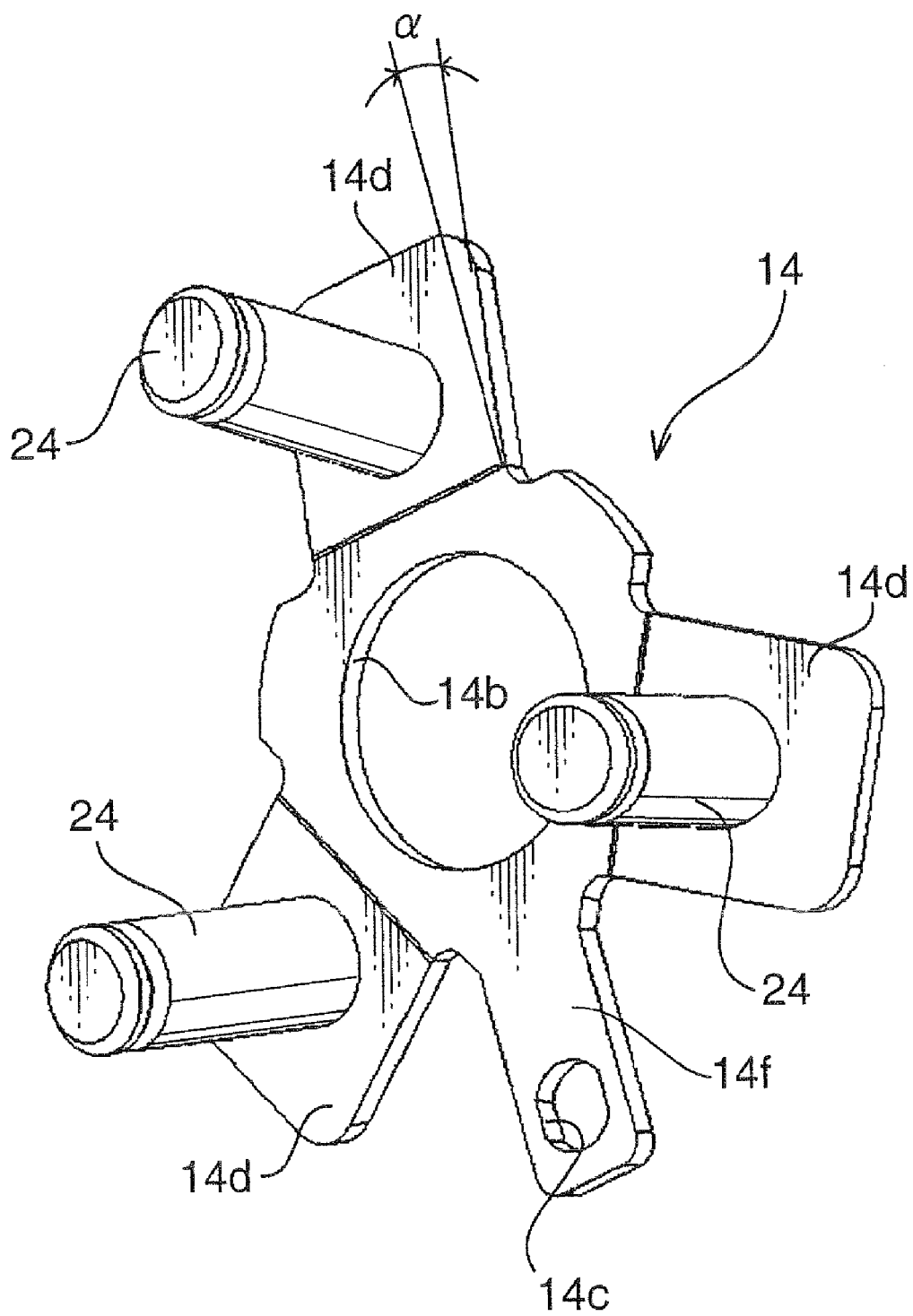
FIG. 4 is a perspective view showing a support plate.

A support plate 14 made of a metal material is attached to the end plate 6. FIG. 4 is a perspective view of the support plate 14. The support plate 14 has a hole 14b formed in a central region thereof to allow the outer peripheral wall of the positioning portion 6b to be fitted thereinto. The support plate 14 also has three base portions 14d formed on a radially outward side relative to the hole 14b to extend radially outwardly at even intervals (at intervals of 120 degrees). Each of the base portions 14d is formed as an inclined surface which becomes gradually lower (i.e., becomes gradually farther from the output shaft 8) in a radially outward direction relative to the hole 14b, in conformity to the inclination angle $\alpha$. Each of the base portions 14d is formed with an insertion hole allowing the shaft member 24 to be press-fitted thereinto. That is, each of the shaft members 24 is supported by the support plate 14, in such a manner that a base end thereof is press-fitted into a corresponding one of the insertion holes of the base portion 14d.

Figure 5:
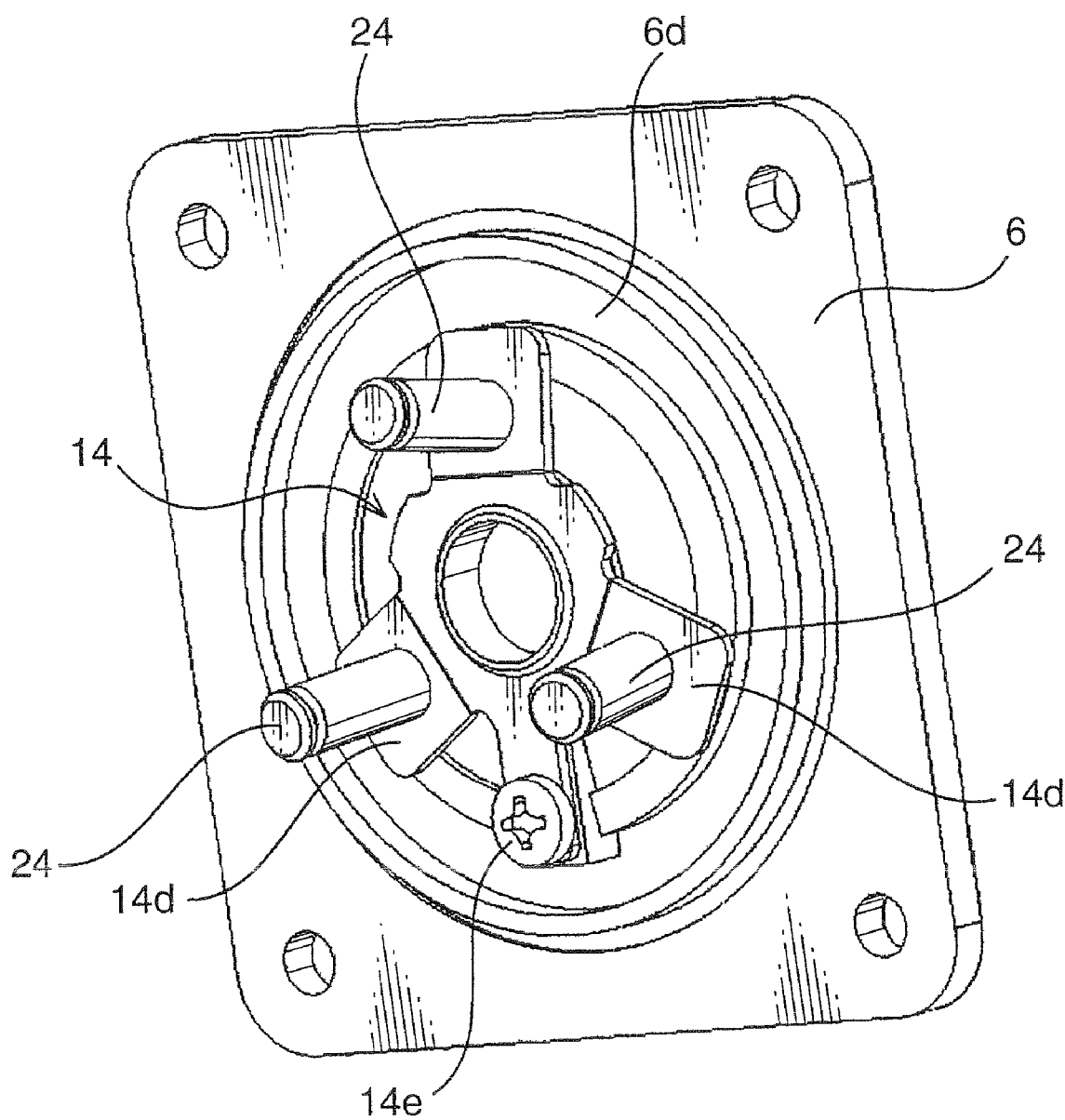
FIG. 5 is a perspective view showing a state after the support plate is attached to the end plate.

Further, the support plate 14 has one strip-shaped portion 14f formed between adjacent two of the base portions 14d to extend in the radially outward direction relative to the hole 14b. The strip-shaped portion 14f has a distal end region formed with a fixing hole 14c. The fixing hole 14c is formed to have a center alignable with that of the fixing hole 6c of the end plate 6. Thus, a screw member 14e can be inserted into the support plate 14 in a direction from the output shaft 8 toward the sun roller 4 to fix the support plate 14 to the end plate 6 (see FIG. 5).

Figure 6:
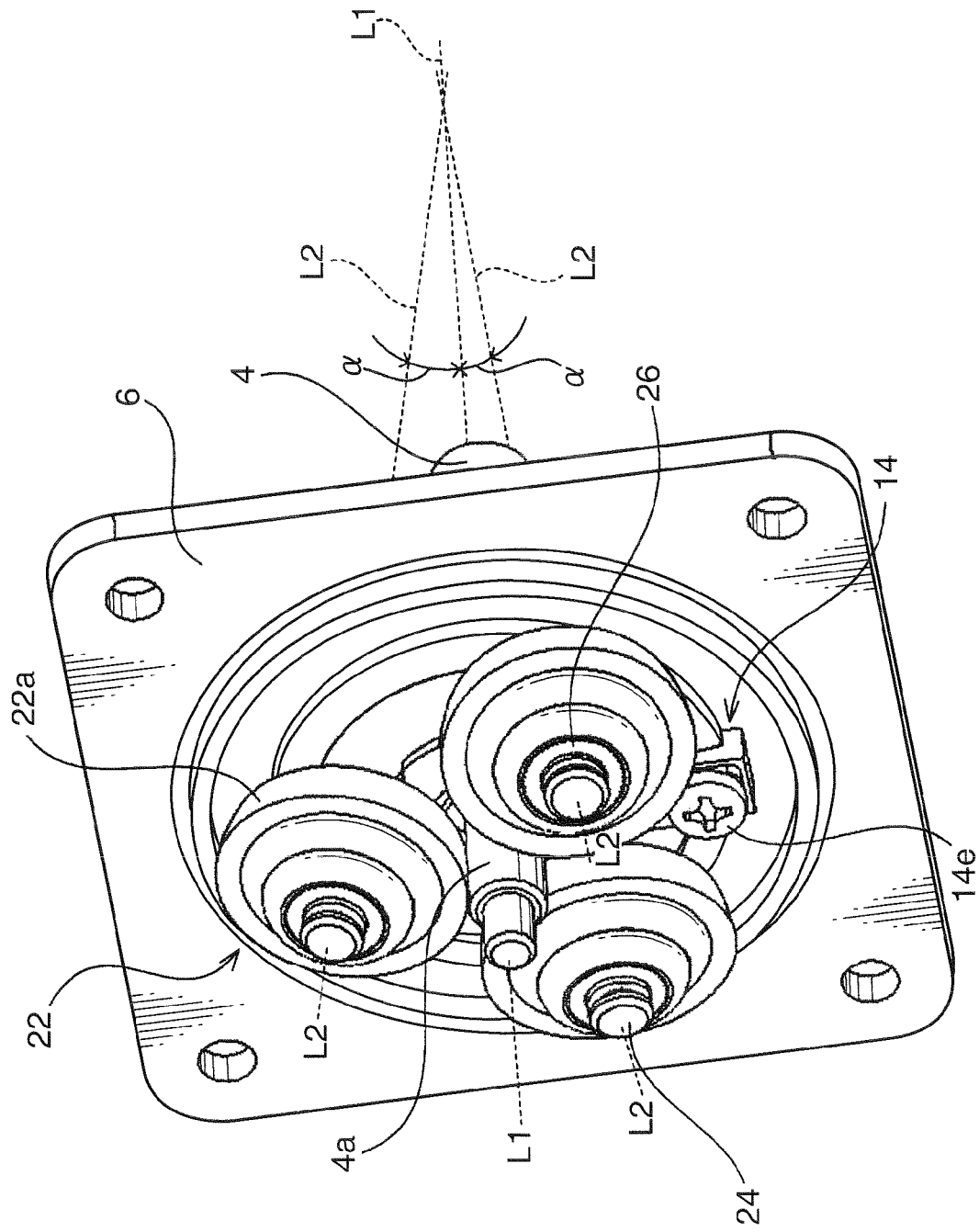
FIG. 6 is a perspective view showing a state after a sun roller and three speed-reduction rollers are attached to the end plate.

As shown in FIG. 6, the three speed-reduction rollers 22 are disposed respectively on corresponding ones of three secondary axes L2 each inclined relative to a rotation axis L1 (first central axis) of the sun roller 4 by a predetermined angle, and at even intervals (at intervals of 120 degrees) in a circumferential direction of the sun roller 4. That is, the three speed-reduction rollers 22 are supported by the respective shaft members 24, and disposed around the sun roller 4 in such a manner that a central axis (second central axis) of each of the shaft members 24 (a rotation axis of each of the speed-reduction rollers 22) is aligned with a corresponding one of the three secondary axes L2.

Each of the secondary axes L2 aligned with the respective central axes of the shaft members 24 of the speed-reduction rollers 22 is inclined relative to the rotation axis L1 of the sun roller 4 by a predetermined angle. The predetermined angle is set at about 10 degrees, which is equal to the inclination angle $\alpha$. In the first embodiment, the three secondary axes L2 aligned with the respective rotation axes of the shaft members 24 are arranged to extend so as to intersect with each other at a single common point on an extension line of the rotation axis L1 of the sun roller 4. The end plate 6 (support plate 14) holds each of the shaft members 24 in the above inclined posture. In this state, respective outer peripheral surfaces 22a of the speed-reduction rollers 22 are in contact with an outer peripheral surface 4a of the sun roller 4.

Figure 7:
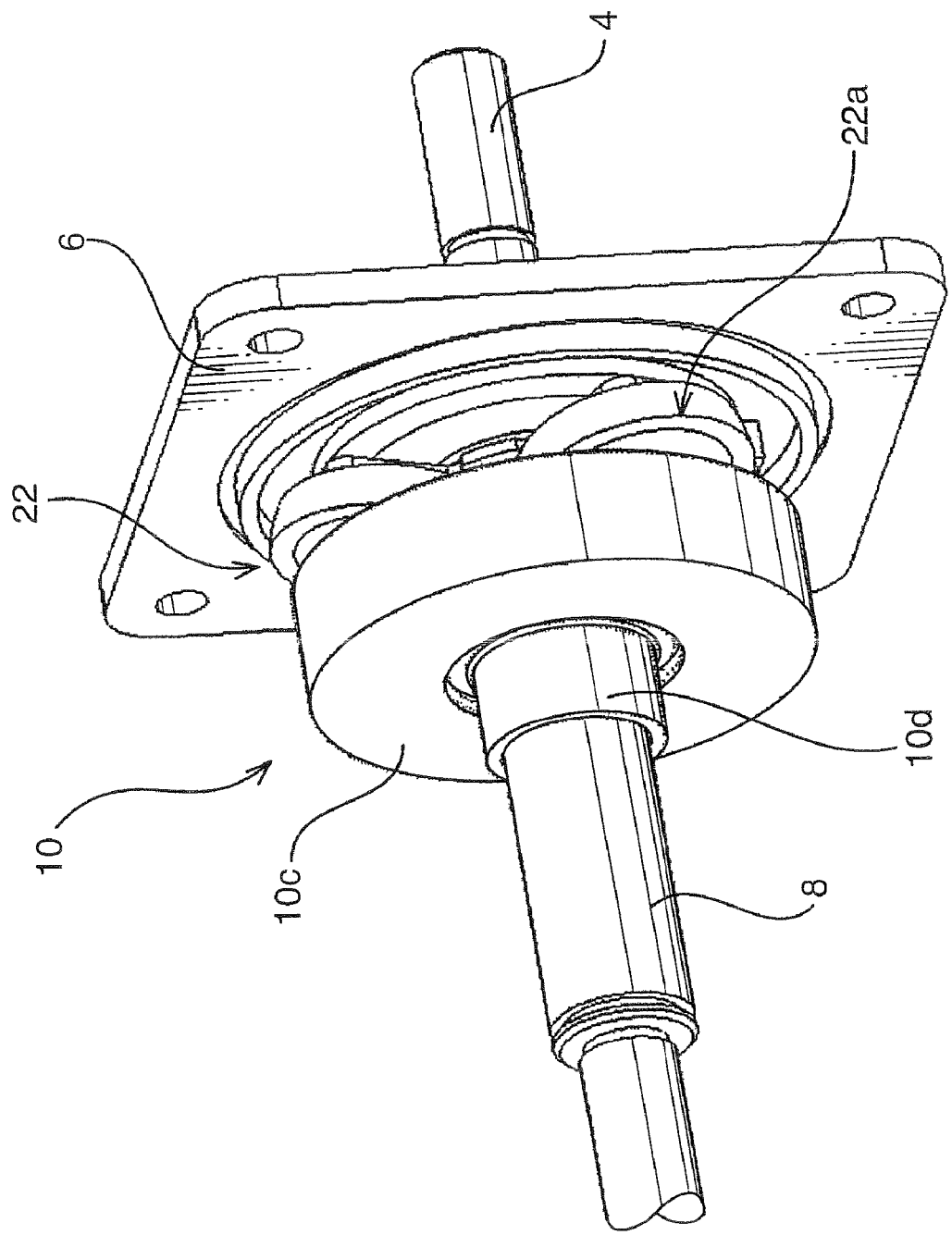
FIG. 7 is a perspective view showing a state after an outer ring is attached to the speed-reduction rollers in FIG. 6.

As shown in FIG. 7, the outer ring 10 is coupled to a base end (screw portion 8a; see FIG. 11) of the output shaft 8. The outer ring 10 is a cylindrical-shaped member which has a housing portion 10d capable of receiving therein the base end of the output shaft 8, and a large-diameter portion 10c having an opening oriented toward the sun roller 4. The outer ring 10 is adapted to press each of the speed-reduction rollers 22 in such a manner that the outer peripheral surface of the speed-reduction roller 22 is pressed against the outer peripheral surface of the sun roller 4 to allow a driving force to be transmitted through means of a traction force between the sun roller 4 and the speed-reduction roller 22. This pressing operation of the outer ring 10 relative to the speed-reduction rollers 22 will be described in more detail later.

Figure 8:
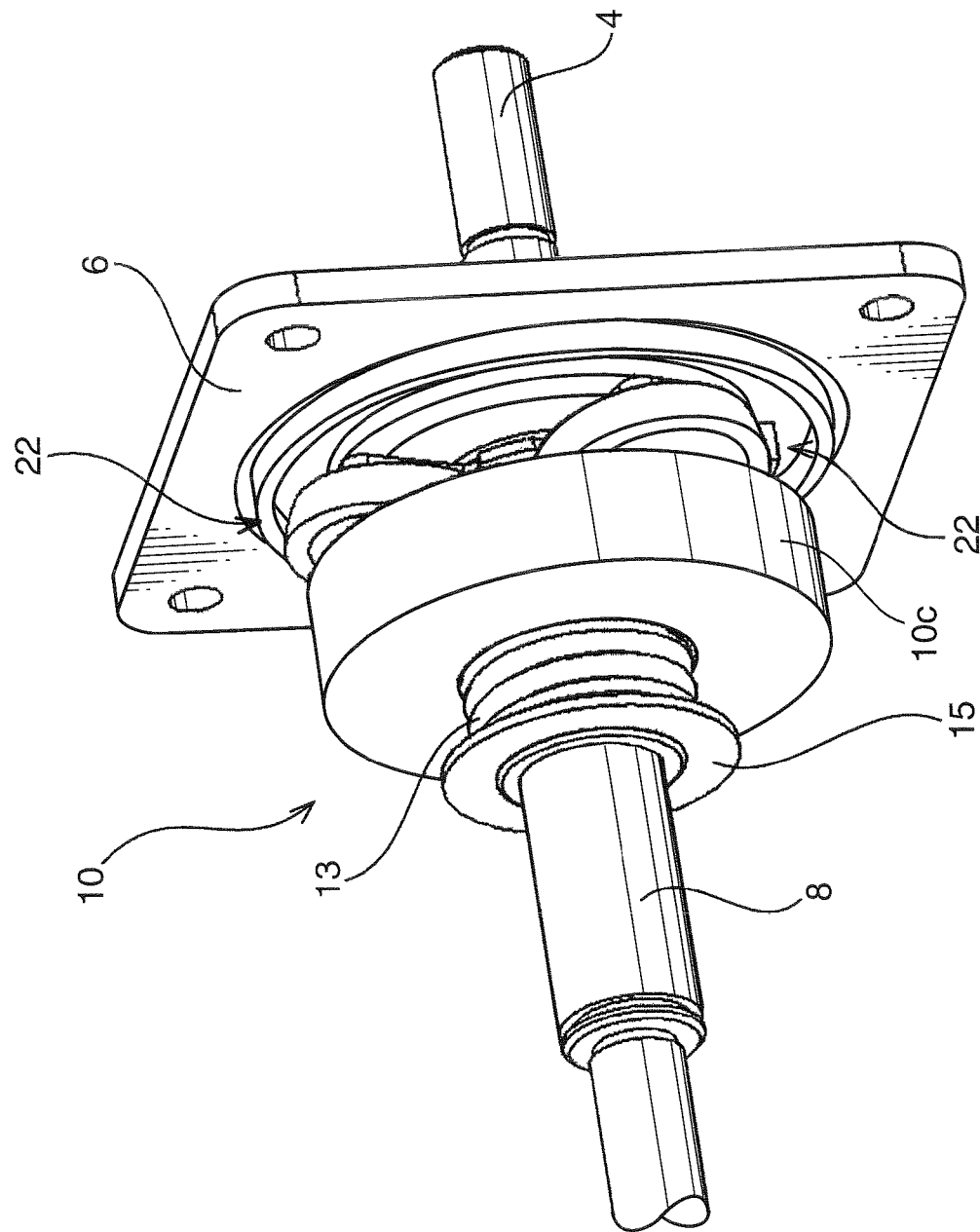
FIG. 8 is a perspective view showing a state after a compression coil spring is attached to the outer ring in FIG. 7.

As shown in FIG. 8, the compression coil spring 13 is attached to surround an outer peripheral surface of the housing portion 10d of the outer ring 10, in such a manner that and one end (first end) of the compression coil spring 13 is in contact with a back surface of the large-diameter portion 10c on an opposite side of the opening thereof, and the other end (second end) is in contact with a sheet-metal spacer 15 fitted on the output shaft 8. Thus, the outer ring 10 receives a repulsion force of the compression coil spring 13 to press each of the speed-reduction rollers 22.

Figure 9:
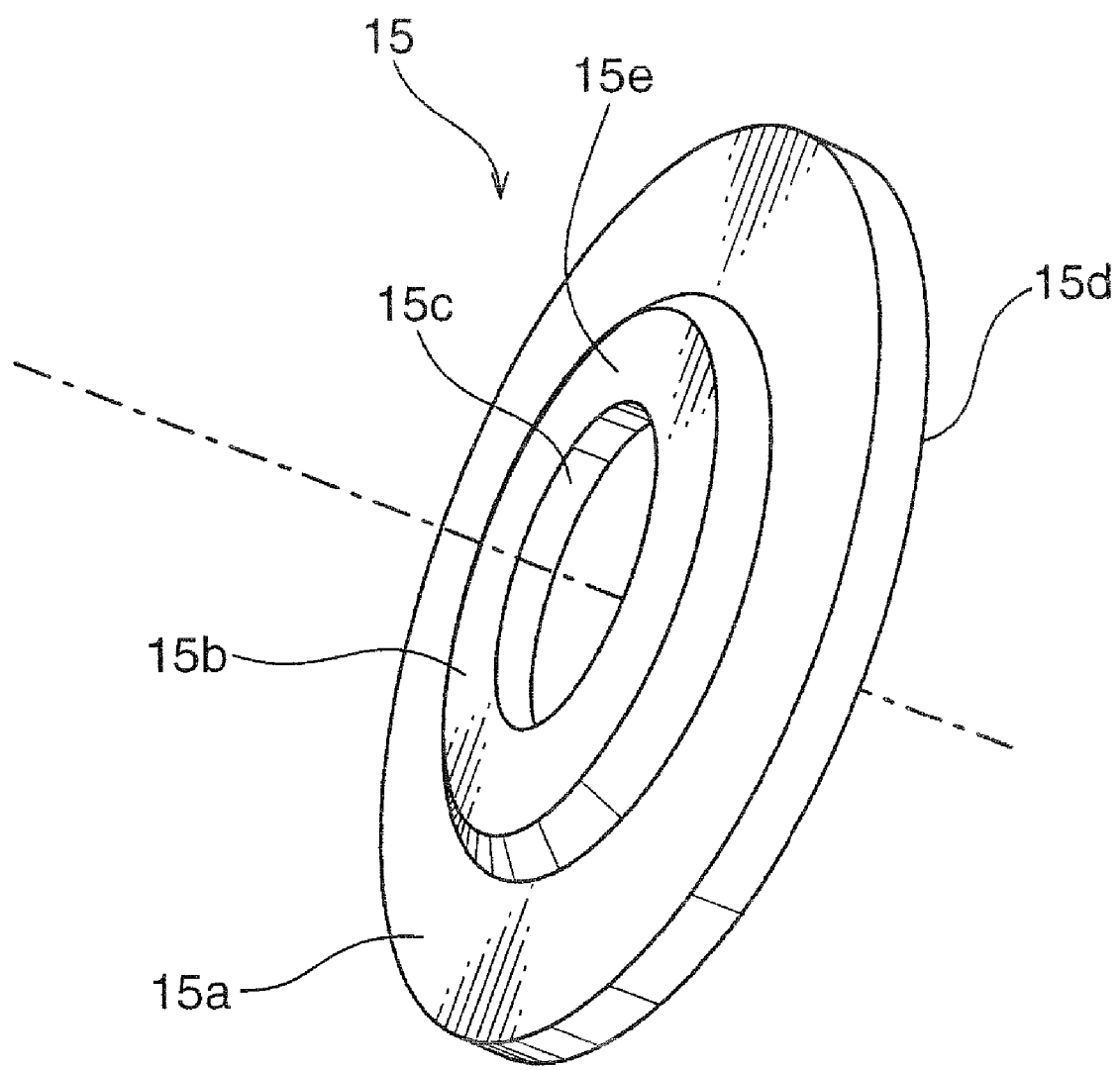
FIG. 9 is a perspective view showing a spacer.
Figure 10:
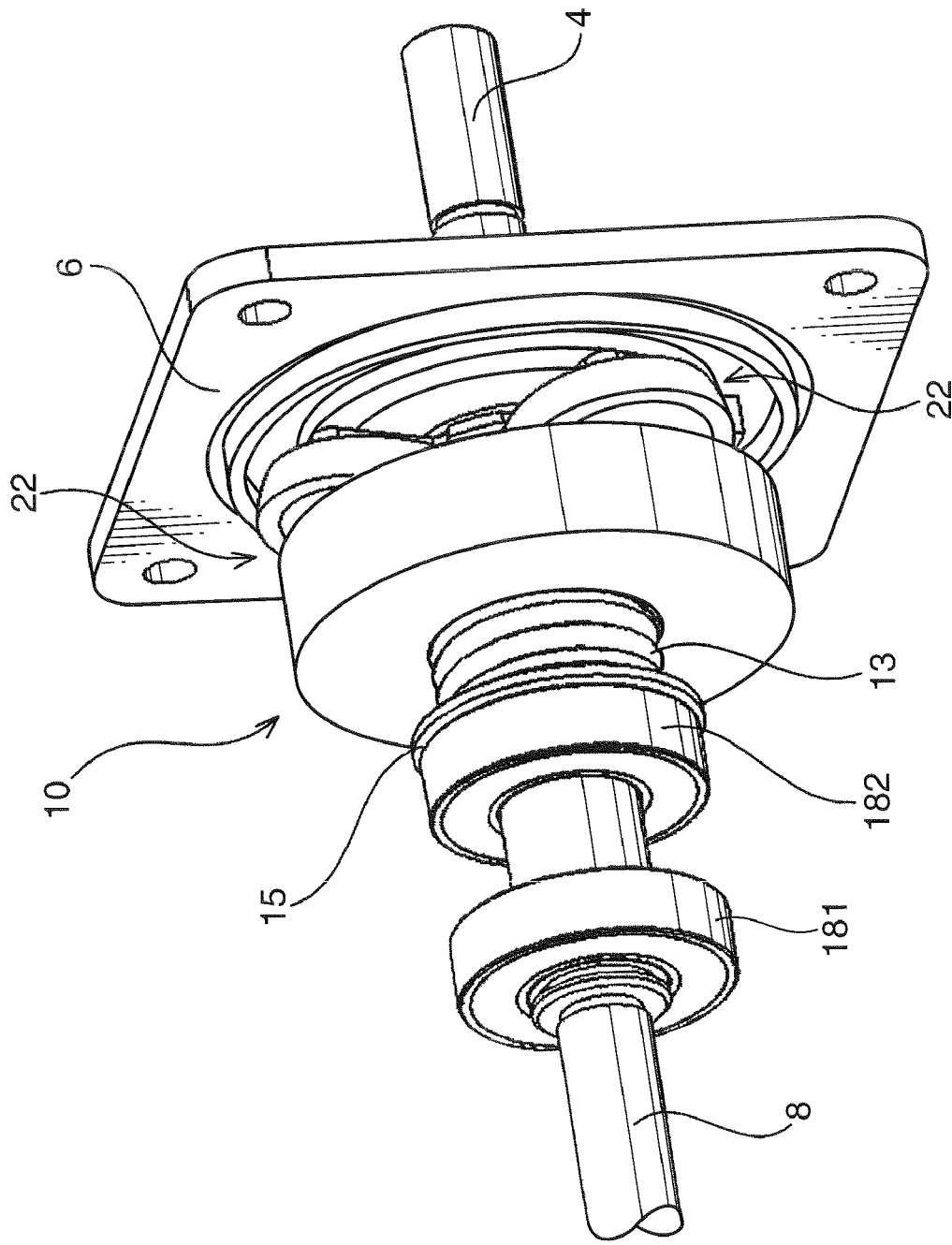
FIG. 10 is a perspective view showing a state after a bearing is attached to an output shaft in FIG. 8.

FIG. 9 is a perspective view of the spacer 15. The spacer 15 comprises a large-diameter portion 15a and a small-diameter portion 15b. The small-diameter portion 15b is formed to protrude relative to the large-diameter portion 15a in a direction away from the motor 1. The spacer 15 has a hole 15c formed in a central region thereof to penetrate therethrough so as to allow the output shaft 8 to be penetratingly inserted thereinto.

The large-diameter portion 15a has an end surface 15d to be brought into contact with the second end of the compression coil spring 13. The small-diameter portion 15b has an end surface 15e to be brought into contact with only an inner race of the third bearing 182 ("second bearing" set forth in the appended claims) supporting the output shaft 8. In the first embodiment, the outer ring 10 and the output shaft 8 are integrally coupled to each other. This structure allows the entire pressing load of the compression coil spring 13 to be applied to the inner race of the third bearing 182 supporting the output shaft 8. Preferably, the third bearing 182 is composed of an angular type or a tapered roller type which is an axial pressure-resistant type. The reason is that these types can be loaded with a combined load of a radial load and an axial load.

If a biasing force of the compression coil spring 13 is applied to a position between an inner race and an outer race of the axial pressure-resistant type bearing, the bearing cannot support such a biasing force to result in breakage, which causes a problem of unable to obtain a long-lifetime traction-drive type driving-force transmission mechanism.

In the first embodiment, the spacer 15 is disposed between the compression coil spring 13 and the axial pressure-resistant type third bearing 182, in such a manner that the small-diameter portion 15b of the spacer 15 allows the biasing force of the compression coil spring 13 to be supported by the inner race of the third bearing 182. Thus, even if the compression coil spring 13 is designed to have a larger diameter in order to obtain a larger biasing force, the biasing force of the compression coil spring 13 will be reliably applied to the inner race of the third bearing 182. This makes it possible to avoid breakage of the third bearing 182 to obtain a long-lifetime traction-drive type driving-force transmission mechanism.

Preferably, each of the three components consisting of the sun roller 4, the speed-reduction roller 22 and the outer ring 10 is made of a material having a relatively high hardness, particularly, a material having a hardness equal to or greater than that of die steel. For example, the sun roller 4 may be made of a material prepared by subjecting a raw material based on SKH (one type of high-speed steel) defined by JIS G4403 to a quenching/tempering treatment at an appropriate temperature. The speed-reduction roller 22 may be made of a material prepared by subjecting a raw material based on SKD (one type of alloy tool steel) defined by JIS G4404 to a quenching treatment at an appropriate temperature. The outer ring 10 may be made of NAK (trade name of a material for a plastic molding die, produced by Daido Steel Co., Ltd.; pre-hardened steel which is one type of die steel) directly without subjecting it to a quenching treatment.

More specifically, the sun roller 4 and the speed-reduction roller 22 and the outer ring 10, may be made of SKH 51, SKD 11, and NAK 55 (trade name, produced by Daido Steel Co., Ltd.), respectively. The SKH 51 for the sun roller 4, the SKD 11 for the speed-reduction roller 22, and the NAK 55 for the outer ring 10, have micro-Vickers hardnesses Hv of about 700, about 520 and about 450, respectively.

In the first embodiment, each of the three components consisting of the sun roller 4, the speed-reduction roller 22 and the outer ring 10 is made of a material having a hardness set to become higher in descending order of surface velocity in respective press contact portions of the components. Specifically, each of the sun roller 4, the speed-reduction roller 22, and the outer ring 10, is made of a material having a hardness set to become higher in this order. In this case, as compared with a case where each of the three components is made of the same material, a lifetime capable of satisfying a target wow and flutter value can be extended about three times, under the same load condition. This makes it possible to retard performance deterioration due to seizing or wearing, and provide enhanced wear resistance.

Preferably, at least one of the three components consisting of the sun roller 4, the speed-reduction roller 22 and the outer ring 10, which is to be driven at a maximum value of surface velocity in respective press contact portions thereof, more specifically the sun roller 4, has a surface subjected to a micro-shot peening treatment (WPC treatment). This treatment comprises bringing ceramic or glass particles having a particle size of about 10 μm (1 μm=1×10$^{-6}$ m) into collision with the surface of the component at sonic speed. This makes it possible to provide enhanced wear resistance to the sun roller 4.

In the sun roller 4 subjected to the micro-shot peening treatment, as compared with a sun roller which is not subjected to this treatment, a lifetime capable of satisfying a target wow and flutter value can be extended about 1.5 times, under the same load condition. This makes it possible to extend a lifetime of the traction-drive type driving-force transmission mechanism M.

A pressing operation of the outer ring 10 relative to each of the speed-reduction rollers 22 will be described below. The outer ring 10 is biased by a repulsion force of the compression coil spring 13, to press each of the speed-reduction rollers 22 along the respective shaft members 24 (secondary axes L2) so as to generate a traction force between the speed-reduction roller 22 and the sun roller 4. In the first embodiment, the outer ring 10 can simply press each of the speed-reduction rollers 22 from one side in a direction causing a reduction in a distance between the speed-reduction roller 22 and the rotation axis L1 of the sun roller 4 when viewed on the corresponding secondary axis L2, in order to generate a traction force between the speed-reduction roller 22 and the sun roller 4. Specifically, when the speed-reduction rollers 22 are pressed in the above direction, they are moved in a direction causing a reduction in a distance therebetween according to the inclination of the corresponding secondary axes L2, and strongly pressed against the sun roller 4 in a direction approaching the sun roller 4, so that a sufficient traction force can be generated. Thus, only one outer ring 10 is disposed on an inward side (on the side of the output shaft 8) relative to the speed-reduction rollers 22, within the casing 2.

Figure 12A:
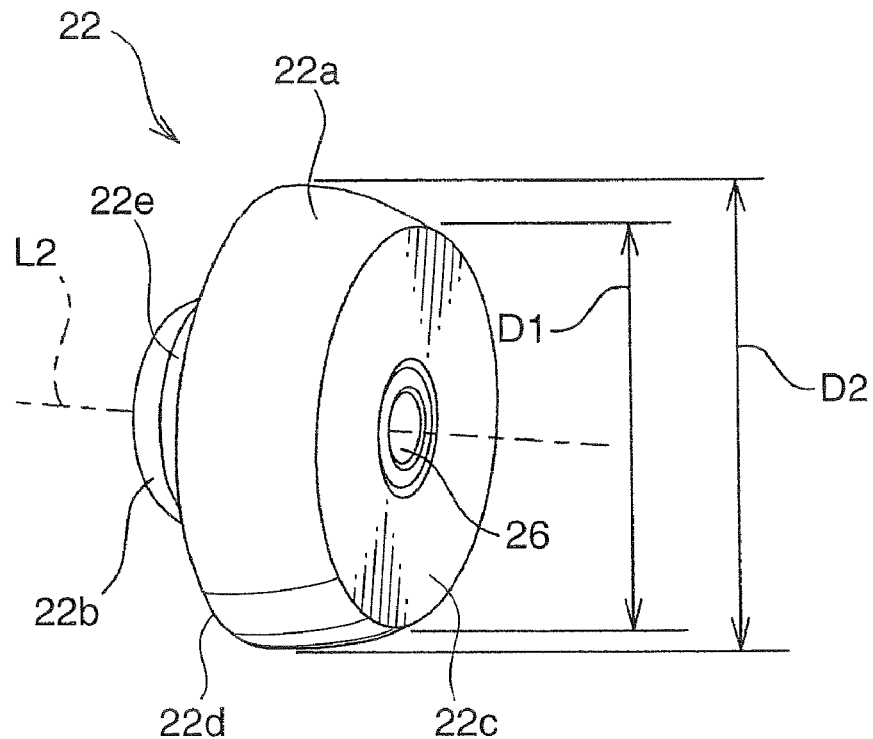
FIGS. 12A and 12B are perspective views showing a configuration of the speed-reduction roller in detail.
Figure 12B:
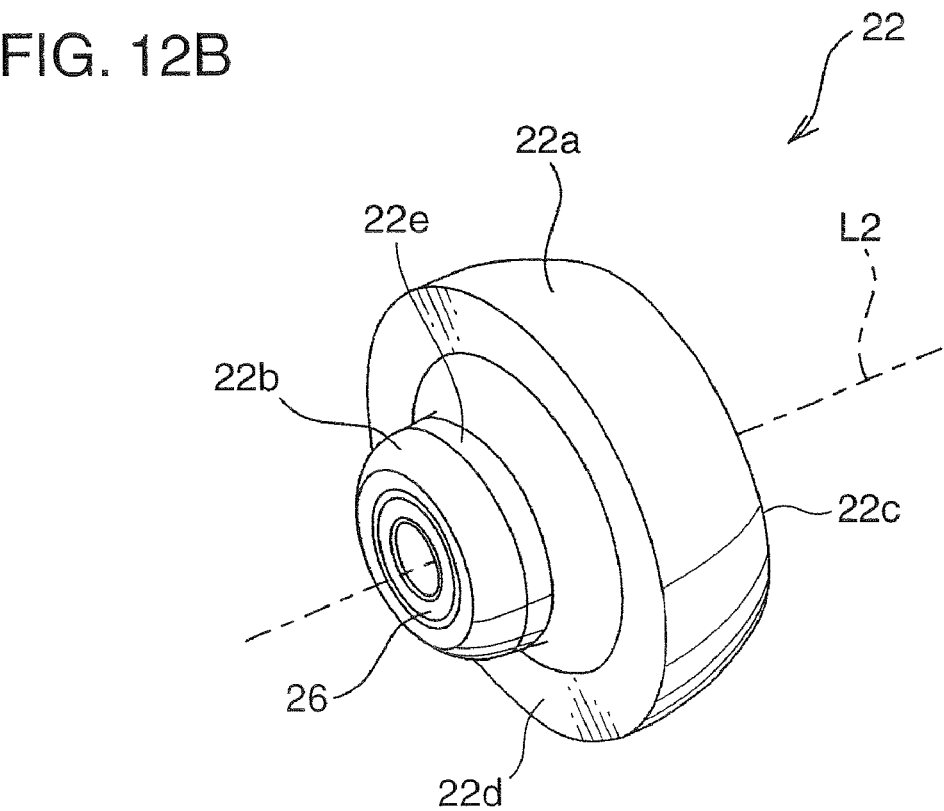

A configuration of the speed-reduction roller 22 will be described in detail below. FIGS. 12A and 12B are perspective views showing an external appearance of one of the speed-reduction rollers 22. The speed-reduction roller 22 has a generally cylindrical shape, and includes an annular outer peripheral surface 22a, a pressure-receiving surface 22b, and first and second end surfaces 22c, 22d parallel to each other. In the viewing angle of FIG. 12A, in an assembled state, the outer ring 10 is located on a back side (on the side of the second end surface 22d) of the speed-reduction roller 22, and the sun roller 4 is located on a front side (on the side of the first end surface 22c) of the speed-reduction roller 22. In the viewing angle of FIG. 12B, in the assembled state, the outer ring 10 is located on the front side (on the side of the second end surface 22d) relative to the speed-reduction roller 22, and the sun roller 4 is located on the opposite side (on the side of the first end surface 22c). When viewed on the corresponding secondary axis L2, the first end surface 22c is located closer to the rotation axis L1 of the sun roller 4.

As shown in FIG. 12A, the speed-reduction roller 22 has a shape in which a diameter D2 on the side of the second end surface 22d is greater than a diameter D1 on the side of the first end surface 22c. Thus, the outer peripheral surface 22a of the speed-reduction roller 22 has a taper shape depending on a dimensional difference between the diameters D1, D2. This taper shape is determined in conformity to the inclination angle (e.g., 10 degrees) of the rotation axis L2 of the speed-reduction roller 22 relative to the rotation axis L1 of the sun roller 4.

Further, the outer peripheral surface 22a (between the first end surface 22c and the second end surface 22d) is formed in a gentle convexedly-curved surface (sectionally convexedly-rounded surface). The curved-shaped peripheral surface 22a of the speed-reduction roller 22 makes it possible to prevent an edge of the speed-reduction roller 22 from being brought into contact with the outer peripheral surface 4a of the sun roller 4. In addition, the curved-shaped peripheral surface 22a makes it possible to reduce an influence of error in the inclination of the shaft member 24 supporting the speed-reduction roller 22. Specifically, even if the inclination angle of the shaft member 24 varies within a tolerance (e.g., ±1 degree), the curved-shaped peripheral surface 22a can suppress occurrence of a significant difference in contact state between the curved-shaped peripheral surface 22a and the outer peripheral surface 4a of the sun roller 4, to generate a traction force with substantially constant characteristics.

As shown in FIG. 12B, the speed-reduction roller 22 has a boss portion 22e formed on the side of the second end surface 22d closer to the outer ring 10, and the pressure-receiving surface 22b is formed as a part of an outer peripheral surface of the boss portion 22e on the side of a distal edge thereof. The pressure-receiving surface 22b has a taper shape toward a distal end of the shaft member 24. In the first embodiment, the pressure-receiving surface 22b is formed in a gentle convexedly-curved surface (sectionally convexedly-rounded surface).

Figure 11:
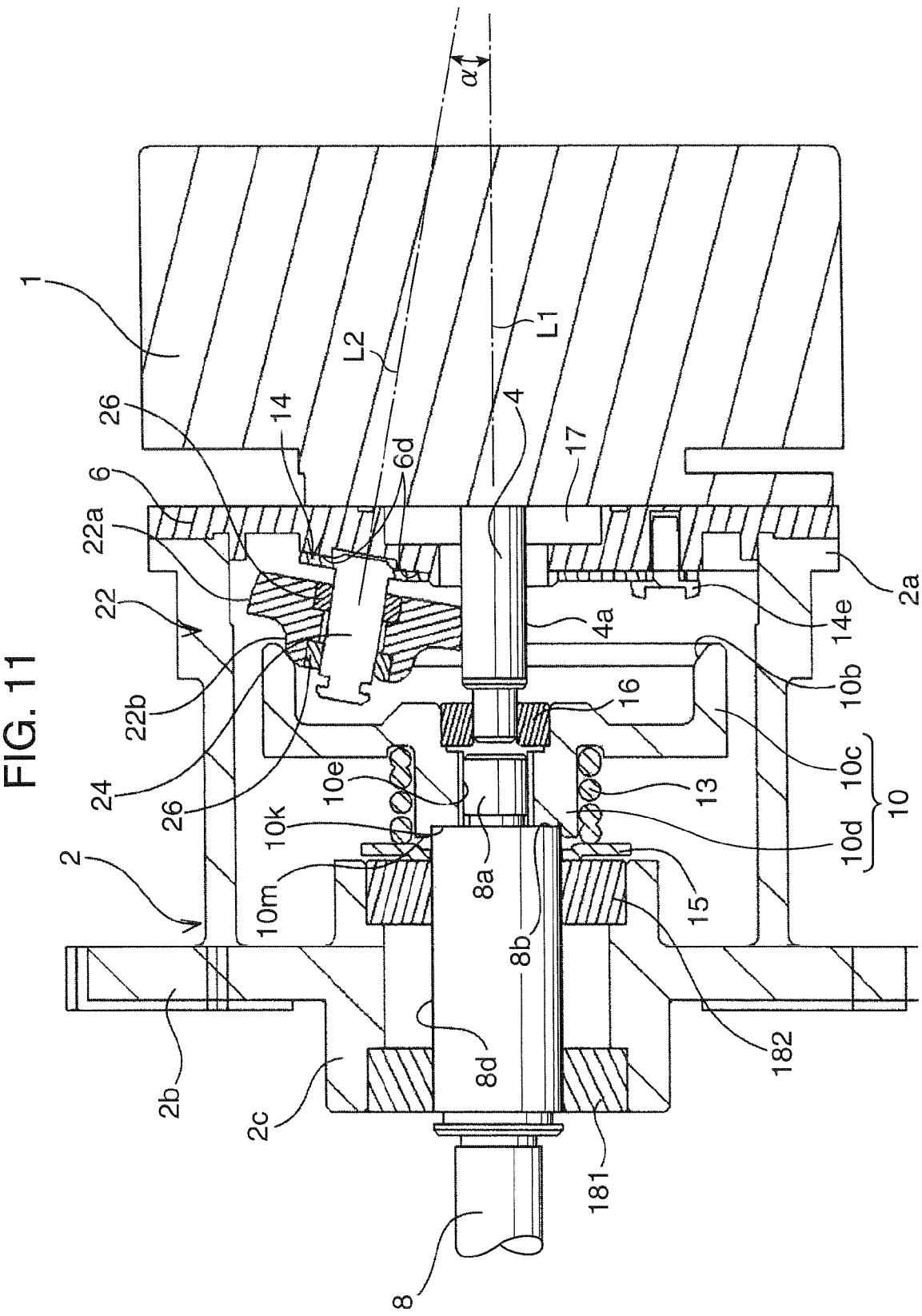
FIG. 11 is a vertical sectional view of the traction-drive type driving-force transmission mechanism in FIG. 1, taken along an axial direction thereof.

As shown in FIG. 11, an inner peripheral edge of the large-diameter portion 10c of the outer ring 10 defining the opening oriented toward the sun roller 4 is formed as a pressing surface 10b having a convexedly-curved shape (sectionally convexedly-rounded shape). In a state after the three speed-reduction rollers 22 are assembled to the end plate 6, this pressing surface 10b is in contact with the respective pressure-receiving surfaces 22b of the speed-reduction rollers 22. Thus, in a state after the compression coil spring 13 is assembled to bias the outer ring 10, the pressing surface 10b gives a pressing force to each of the speed-reduction rollers 22 through the pressure-receiving surface 22b thereof. Thus, the respective outer peripheral surfaces 22a of the speed-reduction rollers 22 are pressed against the outer peripheral surface 4a of the sun roller 4.

The large-diameter portion 10c of the outer ring 10 has an outer diameter slightly less than an inner diameter of the casing 2. This dimensional relation is set to allow the outer ring 10 to be fitted into the casing 2 with a slight gap therebetween, with a high degree of accuracy. The large-diameter portion 10c has a fourth bearing 16 mounted to an approximately central region thereof. The outer ring 10 is rotatably supported by the sun roller 4 through the fourth bearing 16.

In the first embodiment, the outer ring 10 and the output shaft 8 are prepared as separate components, and then coupled to each other by means of screwing (i.e., thread engagement). Specifically, as shown in FIG. 11, the output shaft 8 has the screw portion 8a extending toward the outer ring 10. The screw portion 8a is formed with an external thread adapted to be tightened in a direction of a torque to be applied to the output shaft 8. The output shaft 8 also has a contact surface 8b formed to extend radially outwardly from a base edge of the screw portion 8a.

Correspondingly, the housing portion 10d of the outer ring 10 has a bore 10e, and an internal thread is formed in an inner peripheral of the bore 10e. The external thread of the screw portion 8a is screwed with the internal thread of the bore 10e. Further, the housing portion 10d has a receiving surface 10k formed in a position opposed to the contact surface 8b.

The receiving surface 10k defines a depression opened in a direction away from the sun roller 4, and receives the contact surface 8b. The receiving surface 10k is formed to provide an annular protrusion 10m on a radially outward side relative thereto, in such a manner as to surround a base end of an outer peripheral wall 8d of the output shaft 8.

The above structure makes it possible to simplify a machining process as compared with the case of integrally forming the outer ring 10 and the output shaft 8, so as to achieve reduction in cost, and facilitate an operation of assembling and disassembling the output shaft 8 to and from the outer ring 10. In addition, the output shaft 8 is screwed with the housing portion 10d in a direction causing an increase in a screw tightening force in a driven state thereof. Thus, as long as the output shaft 8 is screwed with the housing portion 10d with an adequate tightening torque during assembling, any rotational fluctuation (driving delay) due to defective tightening will not occur in a rotation direction of the output shaft 8 even for a moment, during actual use. This makes it possible to reliably maintain the connection between the outer ring 10 and the output shaft 8.

As mentioned above, the outer ring 10 presses each of the speed-reduction rollers 22 by a repulsion force of the compression coil spring 13 so as to press the outer peripheral surface of the speed-reduction roller 22 against the outer peripheral surface of the sun roller 4. In the first embodiment, each of the speed-reduction rollers 22 can be infinitesimally moved along the shaft member 24 (secondary axis L2) by strongly pressing the pressing surface 10b of the outer ring 10 against the pressure-receiving surface 22b of the speed-reduction roller 22.

Specifically, the bearings 26 rotatably supporting the speed-reduction roller 22 are assembled to the shaft member 24 in such a manner as to be movable on the shaft member 24. Thus, when a pressing force is applied from the outer ring 10 to the speed-reduction roller 22, the bearings 26 are infinitesimally moved on and along the shaft member 24 (secondary axis L2) together with the speed-reduction roller 22. Each of the bearing 26 is fitted onto the shaft member 24 without occurrence of a wobbling movement, with a high degree of accuracy.

Thus, according to the inclination between the secondary axis L2 aligned with the shaft member 24, and the rotation axis L1 of the sun roller 4, the speed-reduction roller 22 is strongly pressed against the sun roller 4 in a radial direction of the sun roller 4. In the first embodiment, based on this pressing force, an adequate traction force is generated between the outer peripheral surface 22a of the speed-reduction roller 22 and the outer peripheral surface 4a of the sun roller 4 in the presence of the lubricant.

An advantage in assembling and an operation of the traction-drive type driving-force transmission mechanism M will be described below. Assuming that, in a subassembled state of the traction-drive type driving-force transmission mechanism M, the speed-reduction rollers 22 are built in a casing-side subassembly (including the casing 2 and the output shaft 8) instead of a drive-side subassembly (including the motor 1 and the sun roller 4). In this case, during an operation of assembling the casing-side subassembly and the drive-side subassembly together, it is necessary to insert the sun roller 4 into the casing-side subassembly to bring the outer peripheral surface of the sun roller 4 into contact with the respective outer peripheral surfaces of the speed-reduction rollers 22, and then further slidingly move the sun roller 4 inside the casing-side subassembly while maintaining the contact. This operation is also likely to cause scratch or abrasion on the sun roller 4 and the speed-reduction rollers 22.

In contrast, in the first embodiment, the output shaft 8 is rotatably supported by the casing 2, and the outer ring 10 is coupled to the output shaft 8 by means of screwing. Further, the motor 1 is coupled to the casing 2 through the end plate 6, and the shaft members 24 are attached to the end plate 6 while rotatably supporting the respective speed-reduction rollers 22.

That is, the outer ring 10 and the output shaft 8 are built in the casing-side subassembly, whereas the speed-reduction rollers 22 are built in the drive-side subassembly together with the sun roller 4. Thus, during an operation of assembling the casing-side subassembly and the drive-side subassembly together, there is no need to slidingly move the sun roller 4 inside the casing-side subassembly while maintaining the contact between the outer peripheral surface 4a of the sun roller 4 and each of the outer peripheral surfaces 22a of the speed-reduction rollers 22. This makes it possible to facilitate the assembling operation as compared with the case where the speed-reduction rollers 22 are built in the casing-side subassembly, and prevent occurrence of scratch or abrasion on the sun roller 4 and the speed-reduction rollers 22 during the assembling operation, which contributes to obtaining a long-lifetime traction-drive type driving-force transmission mechanism. The easily-assembled structure can also be easily disassembled. This makes it possible to facilitate a maintenance operation for the traction-drive type driving-force transmission mechanism M.

In the assembled state of the traction-drive type driving-force transmission mechanism M, the outer ring 10 is biased toward the sun roller 4 by a repulsion force of the compression coil spring 13. Thus, the outer ring 10 uniformly presses the respective pressure-receiving surfaces 22b of the three speed-reduction rollers 22 by the pressing surface 10b thereof, and thereby the three speed-reduction rollers 22 are slidingly moved by a slight distance, along the respective shaft members 24 together with the bearings 26. Specifically, each of the speed-reduction rollers 22 is infinitesimally moved in a direction causing a reduction in a distance between the speed-reduction roller 22 and the rotation axis L1 of the sun roller 4 when viewed on the corresponding secondary axis L2. Thus, the three speed-reduction rollers 22 are strongly pressed against the sun roller 4 in a direction approaching the central axis (rotation axis L1) of the sun roller 4. Then, when each of the speed-reduction rollers 22 cannot be further moved, the outer ring 10 is also stopped in its position at this timing.

In this state, an ultrahigh-pressure is developed (in a fine gap) between the outer peripheral surface 4a of the sun roller 4 and each of the outer peripheral surfaces 22a of the speed-reduction rollers 22 in the inside of the casing 2, to allow the grease nipped in the fine gap to exert its elasto-plastic property, so that an adequate traction force can be generated during rotation of the sun roller 4.

Based on the generated traction force, each of the three speed-reduction rollers 22 is rotated in a direction opposite to a rotation direction of the sun roller 4, without being orbitally moved around the sun roller 4, and the rotational movement is transmitted to the outer ring 10. Thus, the outer ring 10 is rotated in a direction opposite to the rotation direction of the sun roller 4. This rotational movement of the outer ring 10 is transmitted to the output shaft 8. In this manner, a torque input into the sun roller 4 can be transmitted to the output shaft 8 at a desired speed reduction ratio with a high degree of accuracy. Thus, the traction-drive type driving-force transmission mechanism M can be used as a speed reducer.

A speed reducer based on the traction-drive type driving-force transmission mechanism M according to the first embodiment makes it possible to smoothly transmit a torque without an influence of backlash as in a gear transmission mechanism. Thus, the traction-drive type driving-force transmission mechanism M is suitable as a driving source for an apparatus having a need for controlling a rotational angle with a high degree of accuracy.

In the first embodiment, all the three speed-reduction rollers 22 are adequately pressed against the sun roller 4 by a pressing force of the single outer ring 10 applied thereto from one direction. Thus, the traction-drive type driving-force transmission mechanism M can be made up using a less number of components. In addition, the coupling structure designed to integrally rotate the outer ring 10 together with the output shaft 8 allows the number of the compression coil springs 13 to be reduced to one.

The inclination angle of each of the shaft members 24 (secondary axes L2) relative to the sun roller 4 (rotation axis L1) is not set at an excessively large value (in the first embodiment, the inclination angle is set at about 10°), so that the shaft member 24 itself seldom undergoes an influence (e.g., bending moment) of the pressing of the outer ring 10. This makes it possible to prevent an excessively large radial stress from being applied to the shaft member 24 so as to allow a desired traction-drive effect to be stably obtained using a shaft member having a relatively small diameter.

Each of the bearings 26 is fitted onto the shaft member 24 with a high degree of accuracy to provide a structure where the speed-reduction roller 22 itself is movable along the shaft member 24 in only the direction of the secondary axis L2. This makes it possible to prevent the speed-reduction roller 22 itself from inclining (wobbling) relative to the shaft member 24 so as to reliably avoid uneven wear of the sun roller 4 due to an edge contact of the speed-reduction roller 22. Thus, the traction-drive type driving-force transmission mechanism M can maintain adequate durability over a long period of time, so that, when it is applied to an apparatus, such as an image forming apparatus, a function thereof can be continuously exerted until a lifetime limit of the apparatus.

The first embodiment has been described based on one example where the three shaft members 24 are attached to the support plate 14 inclinedly in such a manner as to spread (i.e., increase a distance therebetween) in a direction toward the distal ends thereof. Alternatively, the three shaft members 24 may be attached to the support plate 14 inclinedly in such a manner as to converge (i.e., reduce the distance therebetween) in a direction toward the respective distal ends thereof. In this case, each of the speed-reduction rollers 22 may be fitted onto a corresponding one of the shaft members 24 while orienting the first and second end surfaces inside out as compared with the first embodiment, wherein the outer ring 10 is designed to press the speed-reduction rollers 22 from the side opposite to that in the first embodiment (i.e., from the side of the end plate 6).

Although the end plate 6 in the first embodiment is made of a resin material for chassis members, the material of the end plate 6 is not limited thereto, but may be a metal material. In this case, each of the shaft members 24 can be directly press-fitted into the metal end plate without using the support plate 14.

In the first embodiment, a circulation member adapted to forcedly circulate the lubricant (e.g., grease) in the inside of the casing 2 may be additionally provided. The circulation member allows the lubricant to be forcedly circulated within the casing 2 so as to supply the lubricant to a press contact portion between the sun roller 4 and each of the speed-reduction rollers 22. This makes it possible to prevent degradation of the lubricant as compared with the traction-drive type driving-force transmission mechanism devoid of the circulation member, to further extend a lifetime of the traction-drive type driving-force transmission mechanism M.

Second Embodiment

Figure 13:
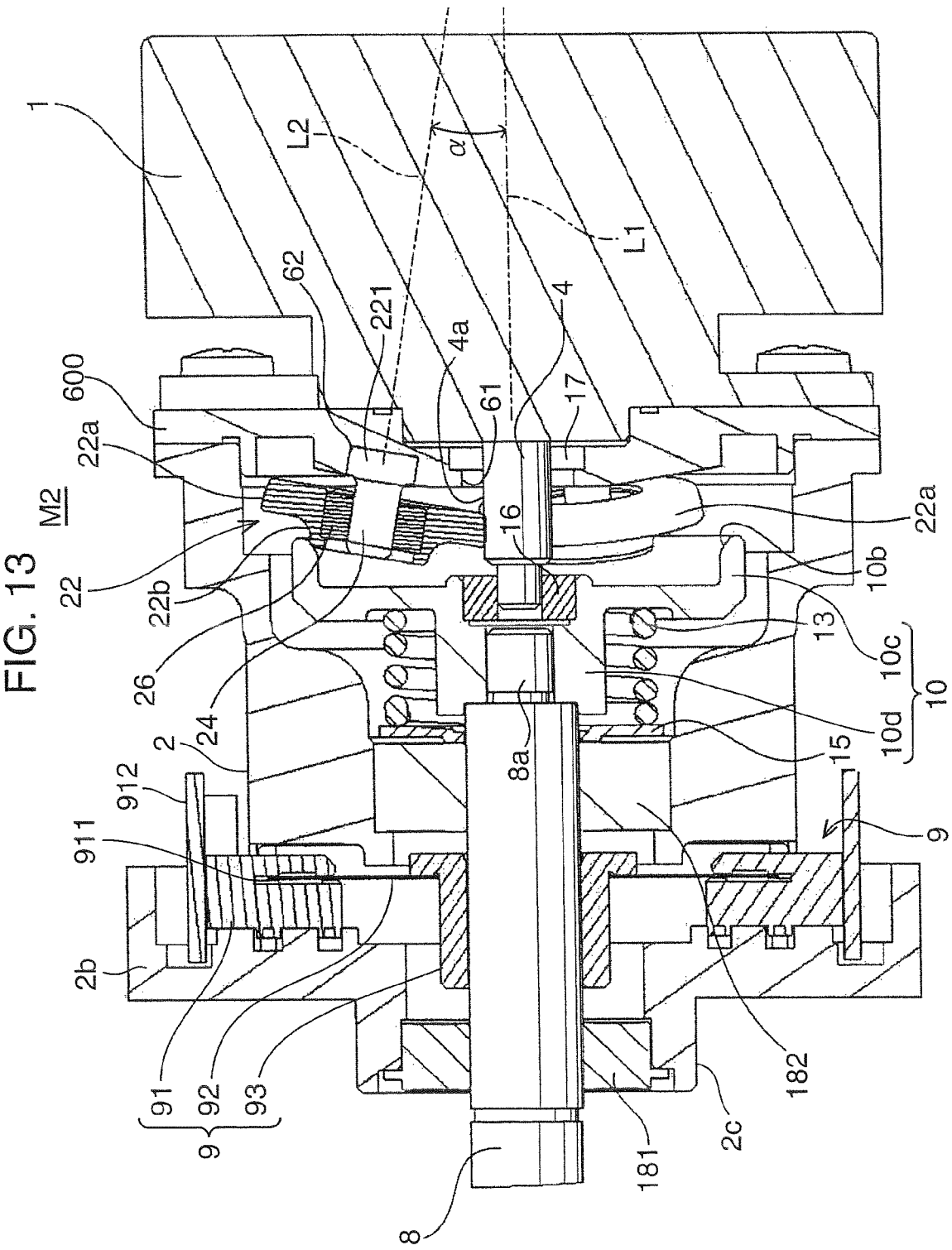
FIG. 13 is a vertical sectional view showing a traction-drive type driving-force transmission mechanism according to a second embodiment of the present invention, taken along an axial direction thereof.
Figure 14:
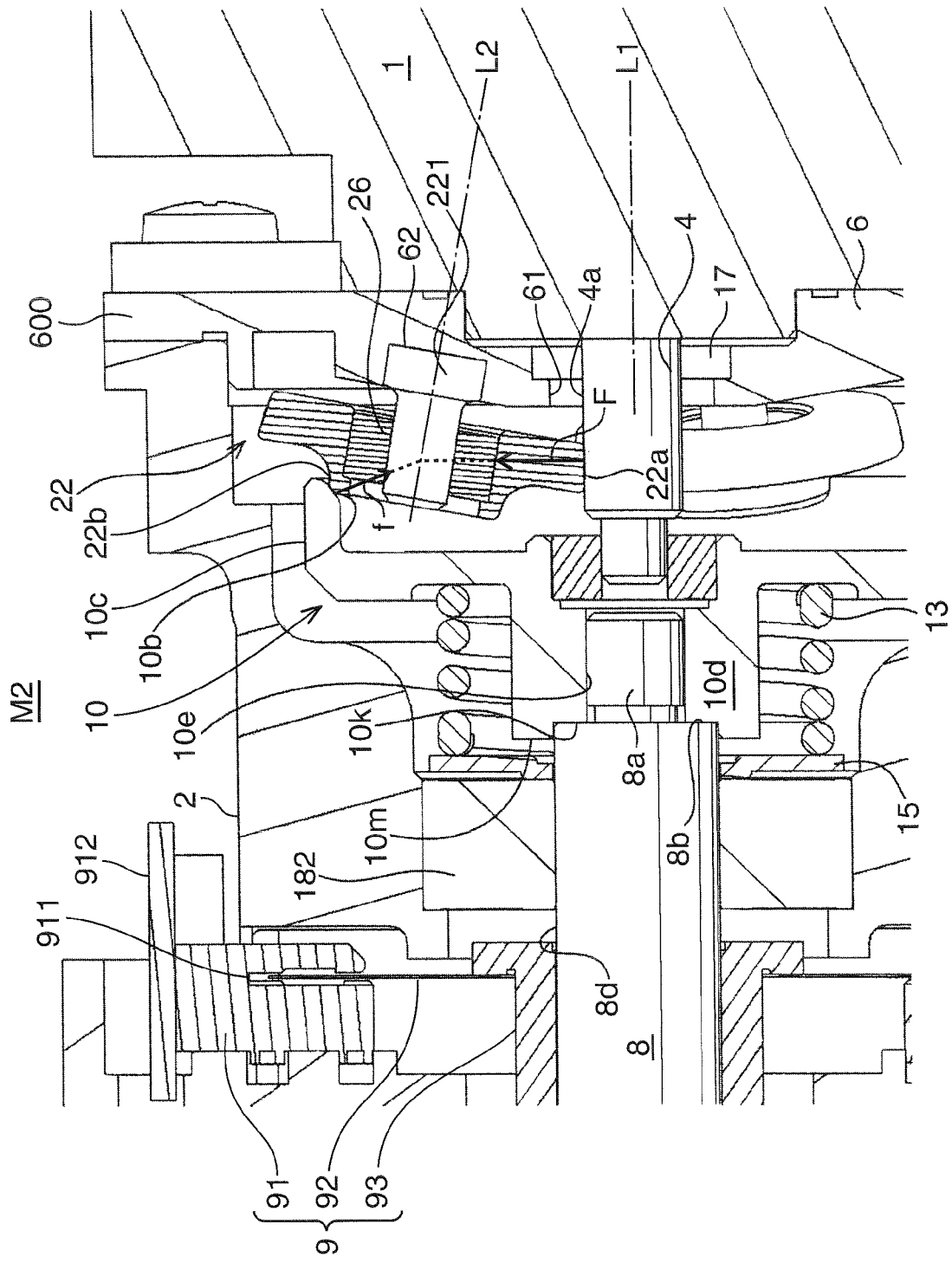
FIG. 14 is a fragmentary enlarged view of the traction-drive type driving-force transmission mechanism in FIG. 13.

FIG. 13 is a vertical sectional view showing a traction-drive type driving-force transmission mechanism M2 according to a second embodiment of the present invention, taken along an axial direction thereof. FIG. 14 is a fragmentary enlarged view of the traction-drive type driving-force transmission mechanism M2 in FIG. 13. The second embodiment shows a traction-drive type driving-force transmission mechanism M2 designed to improve a fatigue resistance limit of three shaft members 24, and provided with a rotary encoder 9 adapted to sense a rotational speed of an output shaft 8. In FIGS. 13 and 14, the same element or component as that in the first embodiment is defined by a common reference numeral or code, and its description will be omitted or simplified.

In the second embodiment, each of three shaft members 24 supporting respective ones of three speed-reduction rollers 22 is fixed to an end plate 600 made of a metal material. The end plate 600 has a hole 61 formed in a central region thereof, and a sun roller 4 is penetratingly inserted thereinto. The end plate 600 also has three support portions 62 formed on a radially outward side relative to the hole 61. Each of the support portions 62 is formed as a concave portion for allowing a base end 221 of a corresponding one of the shaft members 24 to be press-fitted thereinto so as to fixedly support the corresponding shaft member 24. Specifically, each of the support portions 62 is concavely formed to be inclined relative to a rotation axis L1 of the sun roller 4 by a predetermined angle α, in conformity to an inclination of a corresponding one of the shaft members 24 (inclination of a corresponding one of three secondary axes L2).

As with the first embodiment, the three speed-reduction rollers 22 are disposed respectively on corresponding ones of three secondary axes L2 each inclined relative to the rotation axis L1 of the sun roller 4 by a predetermined angle α, and at even intervals (at intervals of 120 degrees) in a circumferential direction of the sun roller 4. For example, the inclination angle α relative to the rotation axis L1 of the sun roller 4 is set at about 10 degrees. The three secondary axes L2 aligned with the respective rotation axes of the shaft members 24 are arranged to extend so as to intersect with each other at a single common point on an extension line of the rotation axis L1 of the sun roller 4. The end plate 600 (support portion 62) holds each of the shaft members 24 in the above inclined posture. In this state, respective outer peripheral surfaces 22a of the speed-reduction rollers 22 are in contact with an outer peripheral surface 4a of the sun roller 4. An outer ring 10 is adapted to press each of the speed-reduction rollers 22 in such a manner that the outer peripheral surface 22a of the speed-reduction roller 22 is pressed against the outer peripheral surface 4a of the sun roller 4 to allow a driving force to be transmitted through means of a traction force between the sun roller 4 and the speed-reduction roller 22.

As with the first embodiment, each of the speed-reduction rollers 22 is infinitesimally moved along the corresponding shaft member 24 (secondary axis L2) by strongly pressing a pressing surface 10b of the outer ring 10 against a pressure-receiving surface 22b of the speed-reduction roller 22. Thus, according to the inclination of the secondary axis L2 relative to the rotation axis L1 of the sun roller 4, the speed-reduction roller 22 is strongly pressed against the sun roller 4 in a radial direction of the sun roller 4. Based on this pressing force, an adequate traction force is generated between the outer peripheral surface 22a of the speed-reduction roller 22 and the outer peripheral surface 4a of the sun roller 4 in the presence of a lubricant.

During this operation, as indicated by the arrowed lines in FIG. 14, a load vector F (first load vector) directing from the outer peripheral surface 4a of the sun roller 4 toward the shaft member 24 is applied to the shaft member 24 in the radial direction of the sun roller 4 (i.e., in a direction perpendicular to the rotation axis L1). On the other hand, a load vector f (second load vector) directing from the pressing surface 10b toward the shaft member 24 is applied to the shaft member 24 in a direction oblique to the radial direction of the sun roller 4.

If the load vector F and the load vector f do not intersect with each other at a single point within the shaft member 24, a relatively large bending moment will be applied to the shaft member 24, because the secondary axis L2 aligned with the central axis of the shaft member 24 is inclined relative to the rotation axis L1 by the predetermined angle α. This bending moment exerts a negative effect on a joining strength between the shaft member 24 and the end plate 600 to cause a problem of being unable to obtain a long-lifetime traction-drive type driving-force transmission mechanism.

In the second embodiment, an intersecting point between the load vector F from the sun roller 4 and the load vector f from the outer ring 10 is set to conform to a single point within the shaft member 24 (see the respective dotted lines extending from the arrowed lines F and the arrowed line f in FIG. 14). That is, the load vector F and the load vector f intersect with each other on the central axis of the shaft member 24 (i.e., at a gravity center in cross section of the shaft member 24). Thus, a bending moment to be applied to the shaft member 24 is significantly lowered to expand a fatigue resistance limit of the shaft member 24. This makes it possible to obtain a longer-lifetime traction-drive type driving-force transmission mechanism M2, and contribute as a more stable speed reducer to improvement in torque transmission efficiency.

This traction-drive type driving-force transmission mechanism M2 is provided with a rotary encoder 9. The rotary encoder 9 is disposed in a space defined between a second end of a casing 2 on an opposite side of a first end thereof having the end plate 600, and a rectangular-shaped flange 2b formed in the second end of the casing 2.

The rotary encoder 9 is provided as a means to sense a rotational speed of the output shaft 8, and control a revolution speed of a motor 1 (i.e., a revolution speed of the sun roller 4) according to need. The rotary encoder 9 comprises a pair of optical sensor units 91, a slit plate 92 and a holding member 93. The holding member 93 is integrally attached onto the output shaft 8 at a position between a second bearing 181 and a third bearing 182. The slit plate 92 is a thin, transparent ring-shaped disk printed with a given light-blocking pattern. The slit plate 92 is fixedly supported by the holding member 93 in such a manner that the output shaft 8 penetrates therethrough. Thus, in conjunction with rotation of the output shaft 8, the slit plate 92 is rotated at the same speed as that of the output shaft 8.

The optical sensor units 91 include a light-emitting element adapted to emit light, and a light-receiving element adapted to receive light, respectively. The optical sensor units 91 are arranged to allow the light-emitting and light-receiving elements to emit light and receive the light through a slit space 911. The slit plate 92 is disposed such that an outer peripheral portion thereof is inserted into the slit space 911 in a substantially non-contact manner. The optical sensor units 91 are supported by a support plate 912 which is fixed to the casing 2. That is, the optical sensor units 91 are fixed to the casing 2, whereas the slit plate 92 is attached to the output shaft 8.

Specifically, the optical sensor units 91 are operable to emit detection light from the light-emitting element disposed on one of opposed wall surfaces in the slit space 911, and receive the detection light by the light-receiving element disposed on the other wall surface, across the slit plate 92 disposed in the slit space 911. A distance between the slit plate 92 and each of the wall surfaces is set at about 0.3 mm at the most. When the slit plate 92 is rotated in conjunction with rotation of the output shaft 9, the detection light is blocked at a timing depending on a rotational speed of the slit plate 92 (i.e., a rotational speed of the output shaft 8) according to the light-blocking pattern of the slit plate 92. For example, a revolution speed of the output shaft 8 can be detected by analyzing the light-blocked timing.

In the above traction-drive type driving-force transmission mechanism M2, during rotation of the sun roller 4, a traction force can be generated between the outer peripheral surface 4*a* of the sun roller 4 and each of the outer peripheral surfaces 22*a* of the speed-reduction rollers 22. Based on the generated traction force, each of the three speed-reduction rollers 22 is rotated in a direction opposite to a rotation direction of the sun roller 4, without being orbitally moved around the sun roller 4, and the rotational movement is transmitted to the outer ring 10. Thus, the outer ring 10 is rotated in a direction opposite to the rotation direction of the sun roller 4. This rotational movement of the outer ring 10 is picked up from the output shaft 8 as an output rotation. Then, a rotational speed of the output shaft 8 is sensed by the rotary encoder 9, and fed back to the motor 1 to control a revolution speed of a motor 1 (i.e., a revolution speed of the sun roller 4) according to need.

Third Embodiment

Figure 15:
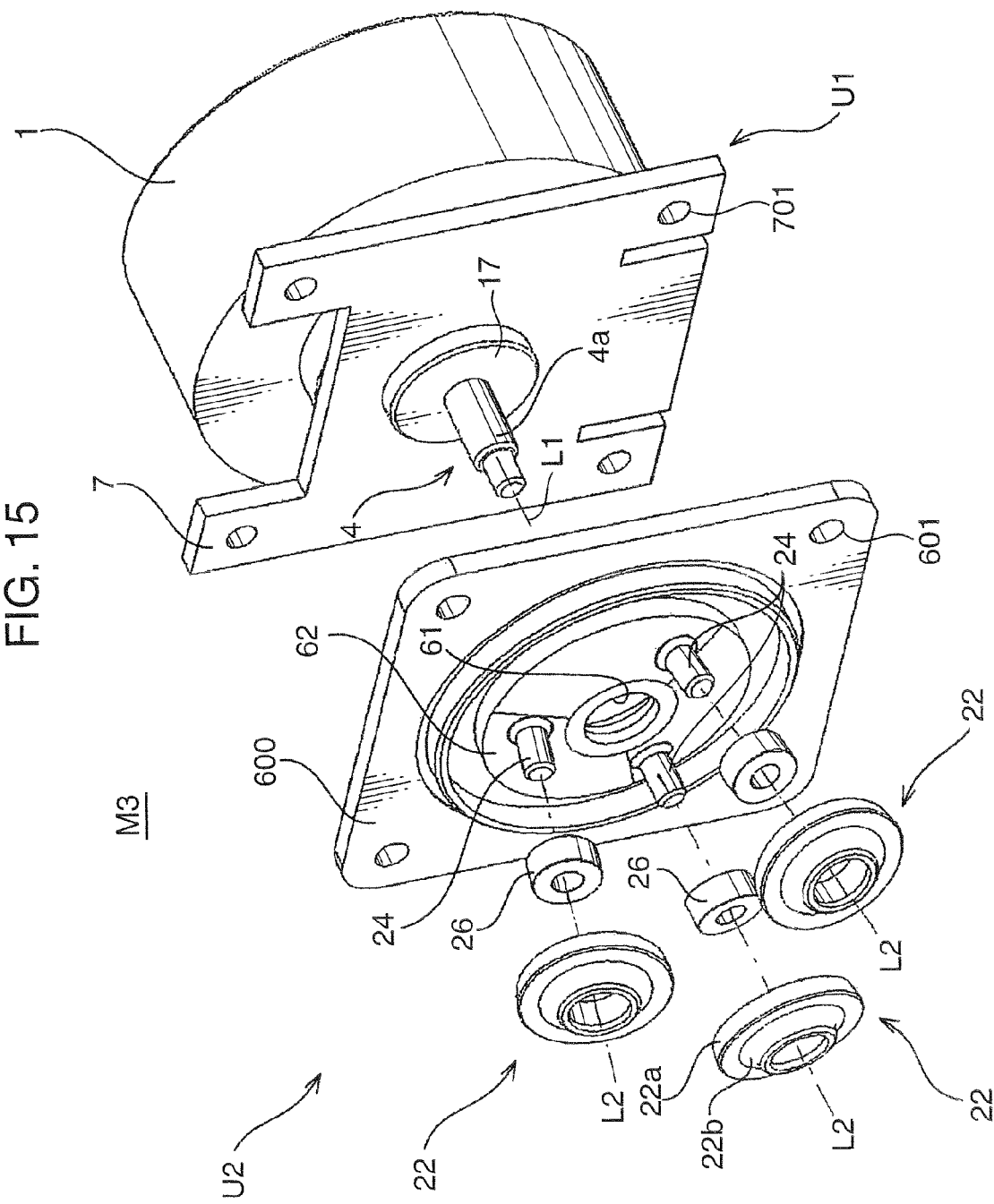
FIG. 15 is an exploded perspective view showing a drive unit and a speed-reduction unit in a traction-drive type driving-force transmission mechanism according to a third embodiment of the present invention.
Figure 16:
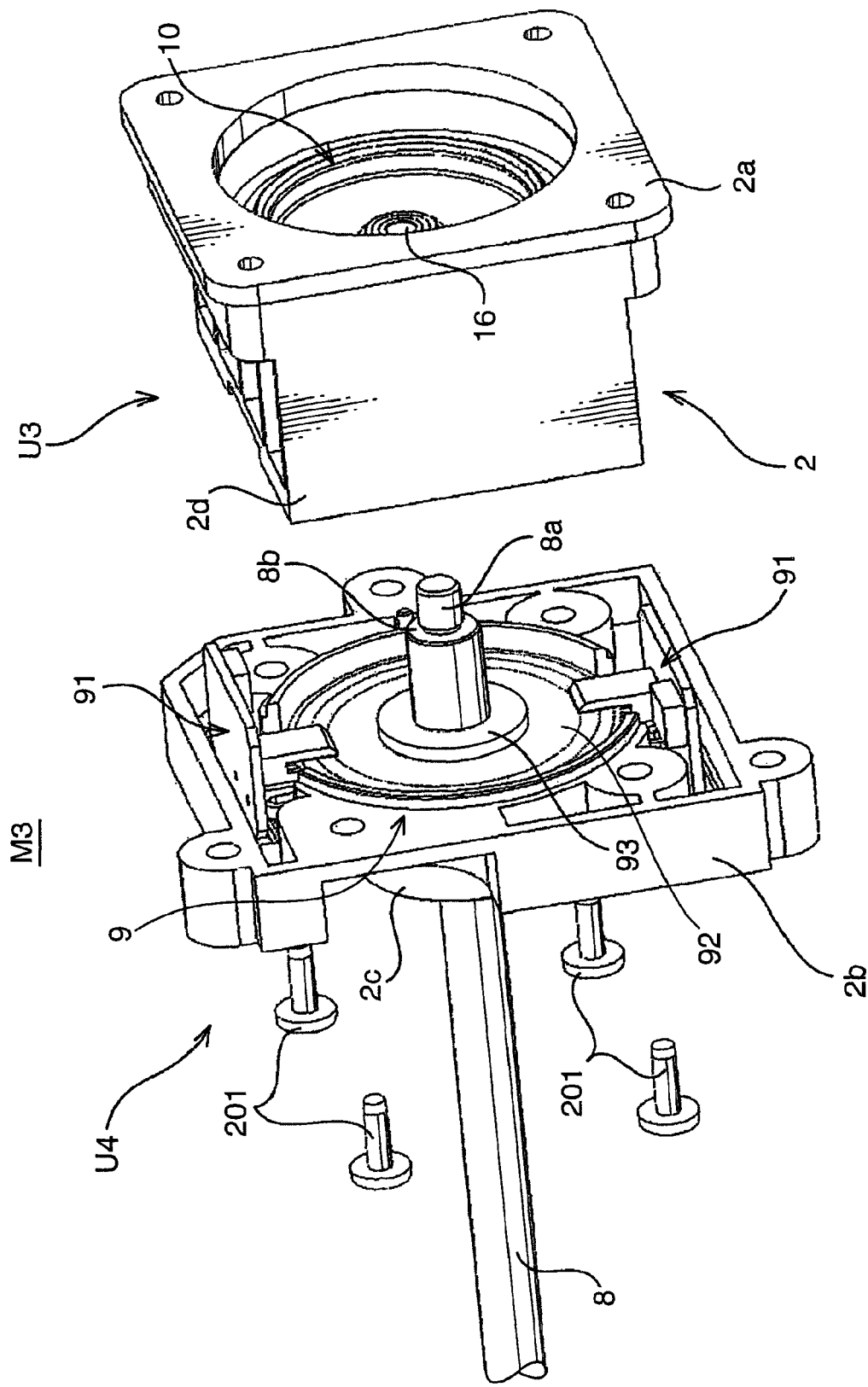
FIG. 16 is an exploded perspective view showing a pressing unit and a speed sensing unit in the traction-drive type driving-force transmission mechanism according to the third embodiment.

The type of traction-drive type driving-force transmission mechanism as in the above embodiments has to be designed in consideration of a need for facilitating a maintenance operation therefor. The reason is that such a type of mechanism requires a high degree of accuracy in assembling, and slight misalignment in assembling error or slight deficiency in lubricant has a great impact on accuracy of speed reduction ratio and product lifetime. The third embodiment shows a traction-drive type driving-force transmission mechanism M3 focusing on the above point. FIG. 15 is an exploded perspective view showing a drive unit U1 and a speed-reduction unit U2 in the traction-drive type driving-force transmission mechanism M3 according to the third embodiment, and FIG. 16 is an exploded perspective view showing a pressing unit U3 and a speed sensing unit U4.

A fundamental structure of the traction-drive type driving-force transmission mechanism M3 is substantially the same as that of the traction-drive type driving-force transmission mechanism M2 according to the second embodiment. Thus, in FIGS. 15 and 16, the same element or component as that in the second embodiment is defined by the common reference numeral or code, and its description will be omitted or simplified.

The traction-drive type driving-force transmission mechanism M3 comprises four units consisting of a drive unit U1, a speed-reduction unit U2, a pressing unit U3 and a speed sensing unit U4, wherein the four units are assembled in such a manner as to be separable (disassembleable) from each other on a unit-by-unit basis. The drive unit U1 includes a motor (driving source), a bearing plate 7 and a sun roller 4. The speed-reduction unit U2 includes an end plate 600, three shaft members 24 and three speed-reduction rollers 22. The pressing unit U3 includes a part (a flange 2*a* and a peripheral wall 2*d*) of a casing 2, an outer ring 10, a compression coil spring 13, a spacer 15 and a third bearing 182. The speed sensing unit U4 serves as a means to sense a rotational speed of an output shaft 8, and includes a part (a flange 2*b* and a boss portion 2*c*) of the casing 2, a second bearing 181 and a rotary encoder 9.

The flange 2*a* of the casing 2 is formed to be coupleable to the motor 1 by a screw member, through a screw hole 601 of the end plate 600 and a screw hole 701 of the bearing plate 7. Thus, the drive unit U1 is separable from the speed-reduction unit U2.

The shaft members 24 and the speed-reduction rollers 22 are provided in the end plate 600 (speed-reduction unit U2), whereas the outer ring 10 is provided in the pressing unit U3. Thus, the speed-reduction unit U2 is separable from the pressing unit U3.

The outer ring 10 is formed to be coupleable to the output shaft 8 by means of screwing (i.e., thread engagement), and the flange 2*b* is formed to be coupleable to the peripheral wall 2*d* by a screw member 201. Thus, the pressing unit U3 is separable from the speed sensing unit U4.

That is, the drive unit U1, the speed-reduction unit U2, the pressing unit U3 and the speed sensing unit U4 are separable from each other on a unit-by-unit basis. Thus, the traction-drive type driving-force transmission mechanism M3 can be readily disassembled as compared with conventional traction-drive type driving-force transmission mechanisms. This makes it possible to facilitate replacement of a component in each of the drive unit U1, the speed-reduction unit U2, the pressing unit U3 and the speed sensing unit U4, and replacement of a lubricant (e.g., grease) within the casing 2, so that a service person can readily perform a maintenance operation for each of the units.

Fourth Embodiment

Figure 17:
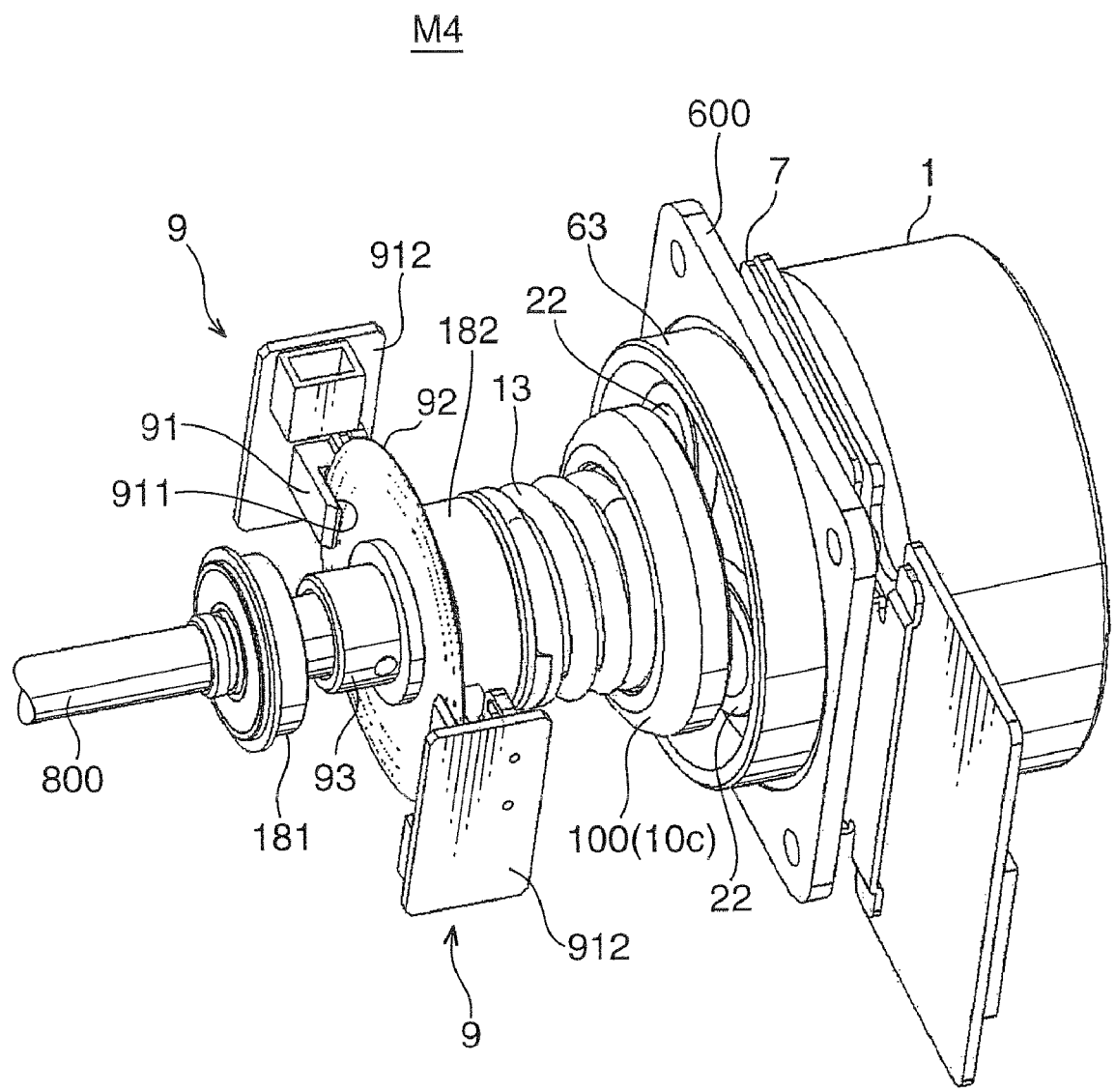
FIG. 17 is a perspective view showing a traction-drive type driving-force transmission mechanism according to a fourth embodiment of the present invention, wherein a casing is removed therefrom.
Figure 18:
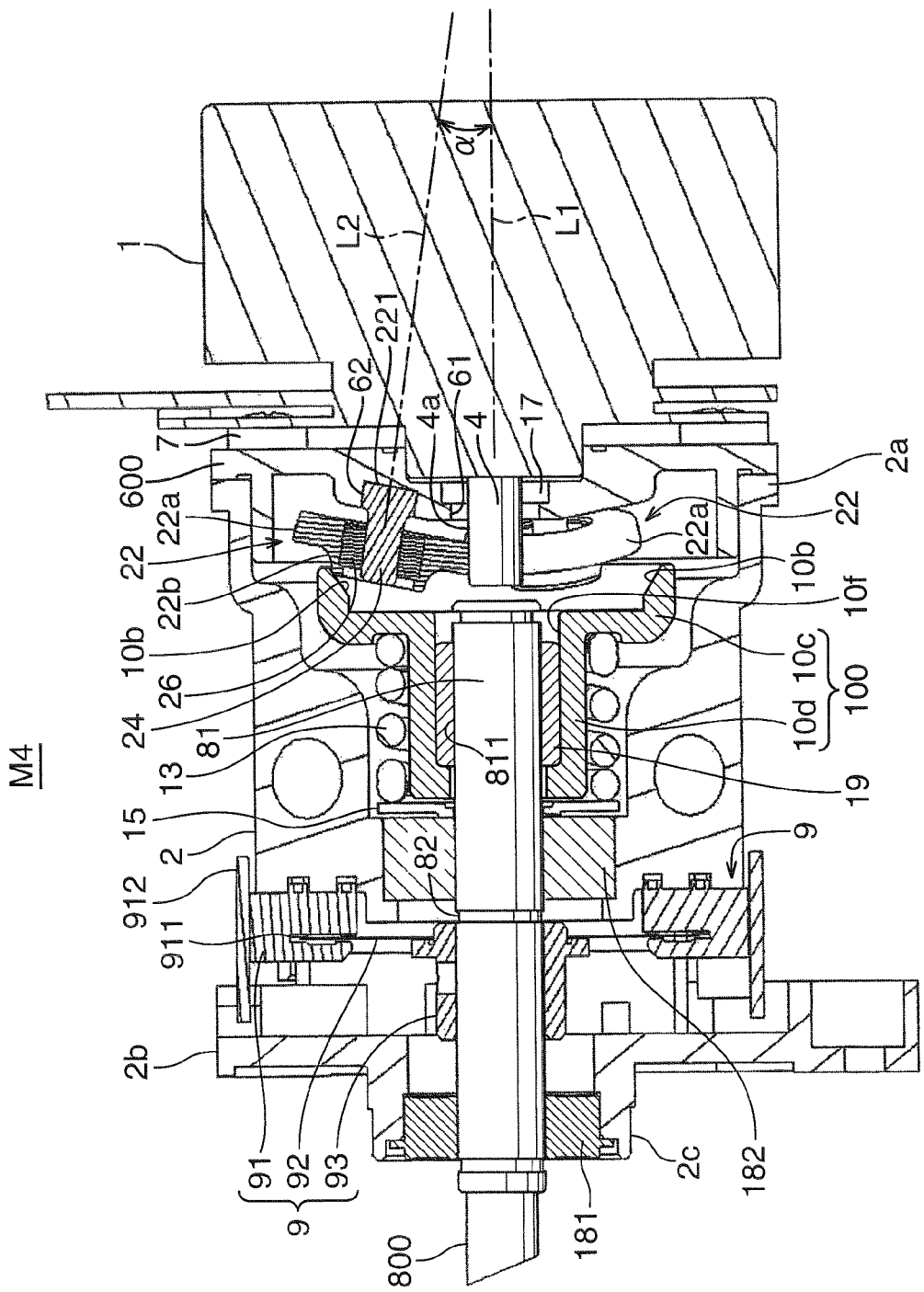
FIG. 18 is a vertical sectional view of the traction-drive type driving-force transmission mechanism according to the fourth embodiment, taken along an axial direction thereof.

FIG. 17 is a perspective view showing a traction-drive type driving-force transmission mechanism M4 according to a fourth embodiment of the present invention, wherein a casing 2 is removed therefrom, and FIG. 18 is a vertical sectional view of the traction-drive type driving-force transmission mechanism M4, taken along an axial direction thereof. In FIGS. 17 and 18, the same element or component as that in the traction-drive type driving-force transmission mechanism M2 according to the second embodiment is defined by the common reference numeral or code, and its description will be omitted or simplified.

When the pressing structure as in the traction-drive type driving-force transmission mechanism M2 is employs, wear will inevitably occurs in the pressing surface 10*b* of the outer ring 10 and the pressure-receiving surface 22*b* of each of the speed-reduction rollers 22. The outer ring 10 is biased by the compression coil spring 13 (see FIG. 13). Thus, when such wear occurs, the outer ring 10 will be displaced from its initial position toward the motor 1 by a distance equivalent to a depth of the wear.

In conjunction with the displacement of the outer ring 10, the output shaft 8 directly coupled to the outer ring 10 is also displaced. Further, the slit plate 92 of the rotary encoder 9 is displaced in the axial direction of the output shaft 8. As described in the second embodiment, the distance between the slit plate 92 and each of the opposed wall surfaces in the slit space 911 is only about 0.3 mm at the most. Thus, if the slit plate 92 is displaced even slightly, the slit plate 92 will be brought into contact with the wall surface in the slit space 911 to cause a problem about chipping or breakage of the slit plate 92.

In view of the above problem, the fourth embodiment shows a traction-drive type driving-force transmission mechanism designed to couple between an outer ring 100 and an output shaft 800, in such a manner as to allow the outer ring 100 to be displaced along an axial direction of the output shaft 800, while allowing a torque to be transmitted from the outer ring 100 to the output shaft 800. As one example, FIG. 18 shows a structure where the outer ring 100 and the output shaft 800 are coupled to each other through a clutch device 19.

The clutch device 19 is adapted to selectively couple between the outer ring 100 and the output shaft 800 in such a manner as to allow a torque to be transmitted from the outer ring 100 to the output shaft 800. The clutch device 19 is composed of a one-way clutch capable of transmitting a torque directed in only one rotation direction about an axis. For example, the one-way clutch may be a type which comprises an outer race having a cam surface, a roller disposed on an inner peripheral surface of the outer race, and a cage for holding the roller. It is understood that any other suitable clutch device, such as a one-way clutch using a locking sprag, or other friction clutch, such as a dog clutch, may also be employed.

The clutch 19 is fixedly attached to the outer ring 100, and fitted on (around) the output shaft 800 in such a manner as to be slidably displaced in an axial direction of the output shaft 800. More specifically, the clutch 10 is press-fitted on an inner peripheral surface of a housing portion 10d of the outer ring 100, in such a manner that the outer race of the clutch 10 is fixedly engaged with an inner wall 10f of the housing portion 10d. On the other hand, an inner peripheral surface of the clutch 19 is fitted on (around) an outer peripheral surface 811 of a base end 81 of the output shaft 800, in such a manner that the roller disposed on the inner peripheral surface of the clutch 19 is engaged with the outer peripheral surface 811 of the output shaft 800 during rotation of the outer ring 100 in one direction (e.g., in a clockwise direction), but it is not engaged with the outer peripheral surface 811 of the output shaft 800 during rotation of the outer ring 100 in the other direction (e.g., in a counterclockwise direction).

Thus, when the outer ring 100 is rotated in the clockwise direction, a torque is transmitted from the outer ring 100 to the output shaft 800 through the clutch 19. On the other hand, when the outer ring 100 is rotated in the counterclockwise direction, the clutch 19 runs idle, and becomes slidingly displaceable in the axial direction of the output shaft 800. In the fourth embodiment, the outer ring 100 is biased in a direction toward a motor 1 by a compression coil spring 13. Thus, the outer ring 100 can be displaced in a direction allowing each of three speed-reduction rollers 22 to be pressed against a sun roller 4.

The outer peripheral surface of the output shaft 800 is formed with an engagement groove 82. The engagement groove 82 is formed adjacent to an installation position of a third bearing 182, and a portion of a casing 2 is in engagement with the engagement groove 82. Thus, a displacement of the output shaft 800 itself along the axial direction thereof is restricted.

A rotary encoder 9 is provided to sense a rotational speed of the output shaft 800, and control a revolution speed of a motor 1 (i.e., a revolution speed of the sun roller 4) according to need. The rotary encoder 9 comprises a pair of optical sensor units 91, a slit plate 92 and a holding member 93. This rotary encoder 9 is the same as that described in the second embodiment.

In the traction-drive type driving-force transmission mechanism M4 according to the fourth embodiment, the outer ring 100 is coupled to the output shaft 800 through the one-way clutch 19, so that a displacement of the output shaft 800 and the slit plate 92 is not caused by the displacement of the outer ring 100. Specifically, the clutch 19 is press-fitted onto the inner peripheral surface of the housing portion 10d of the outer ring 100 in such a manner as to be integrated with the outer ring 100, and the output shaft 800 is penetratingly inserted into a shaft hole of the clutch 19.

Thus, except when the outer ring 100 is rotated in a direction causing the clutch 19 to transmit a torque, each of the clutch 19 and the outer ring 100 can be displaced in the axial direction of the output shaft 800. Further, the engagement groove 82 is provided in the outer peripheral surface of the output shaft 800 to restrict an axial displacement of the output shaft 800 itself. Thus, even if the outer ring 100 is displaced toward the motor 1 by a distance equivalent to a depth of wear in a pressing surface 10b of the outer ring 100 and a pressure-receiving surface 22b of each of the speed-reduction rollers 22, the output shaft 800 and the slit plate 92 are not displaced, so that the slit plate 92 can be reliably rotated in the same plane to prevent contact between the slit plate 92 and a wall surface in a slit space 911.

Figure 19:
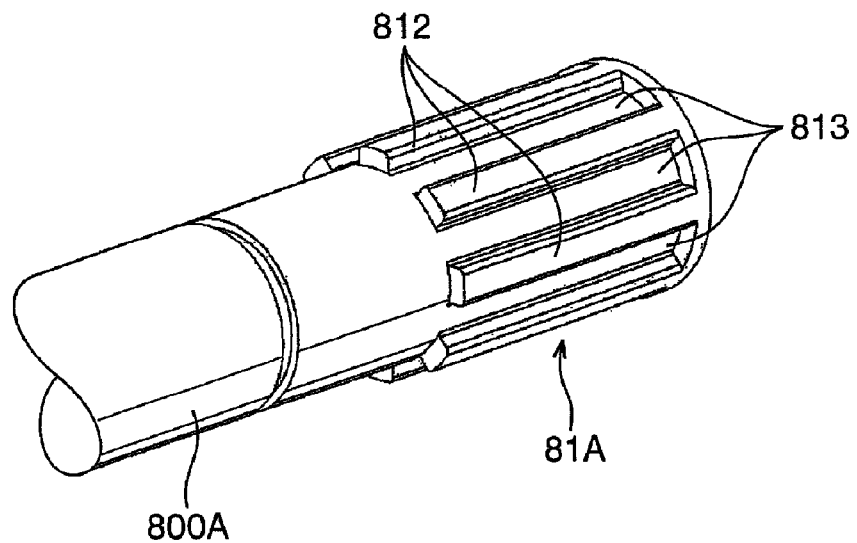
FIG. 19 is a perspective view showing an end of an output shaft in one example of modification of a coupling structure in the fourth embodiment.
Figure 20:
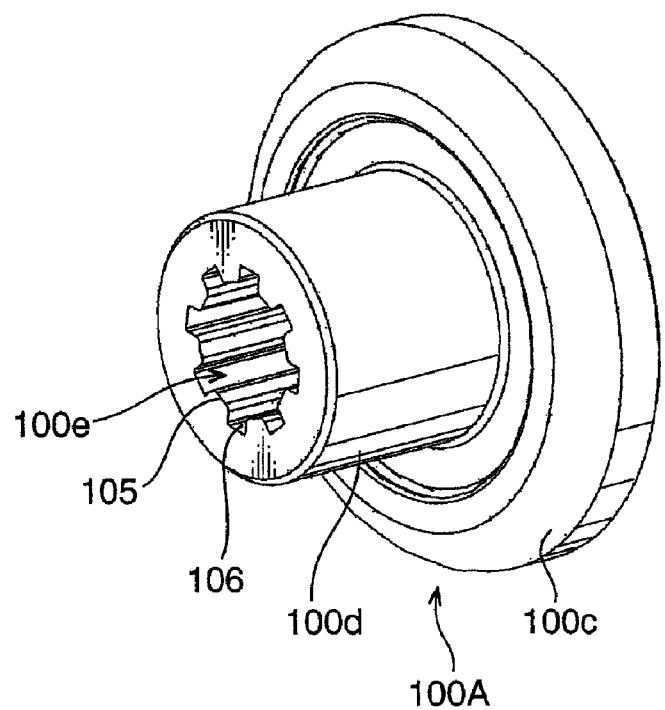
FIG. 20 is a perspective view showing an outer ring in the example of modification of the coupling structure.
Figure 21:
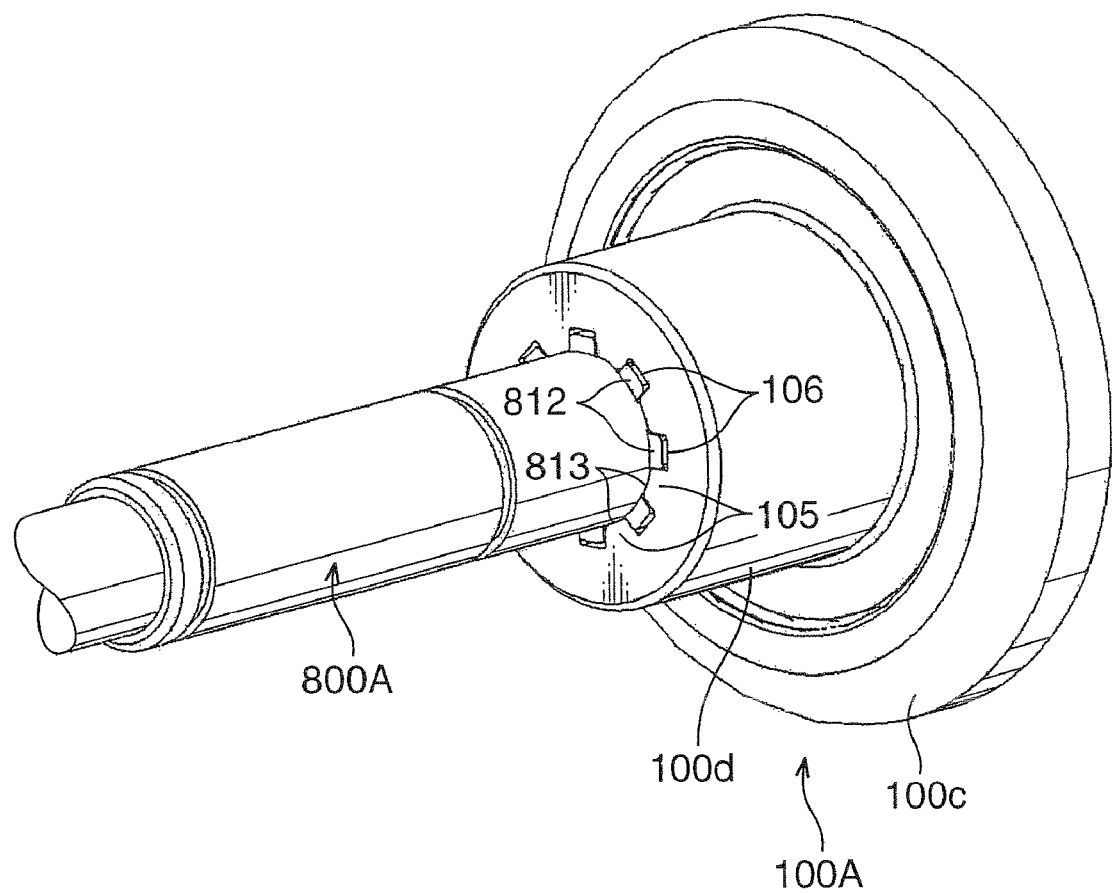
FIG. 21 is a perspective view showing a state after the output shaft in FIG. 19 and the outer ring in FIG. 20 are coupled together.

An example of modification of the coupling structure in the fourth embodiment will be described below. FIGS. 19 to 21 are explanatory perspective views of a coupling structure between an output shaft 800A and an outer ring 100A, as one example of modification. FIG. 19 shows a based end 81A of the output shaft 800A. The base end 81A has a plurality of linear protrusions 812 (first protrusions) formed to protrude from an outer peripheral surface thereof and extend in an axial direction of the output shaft 800A, and arranged at even intervals in a circumferential direction of the output shaft 800A. A plurality of linear recesses 813 (first recesses) are defined between adjacent ones of the linear protrusions 812 to extend in the axial direction of the output shaft 800A.

FIG. 20 shows the outer ring 100A. The outer ring 100A has a housing portion 100d and a large-diameter portion 100c. The housing portion 100d is formed with a hole 100e for receiving therein the base end 81A of the output shaft 800A. A wall surface (inner wall of the housing portion 100d) defining the hole 100e is formed with a plurality of linear recesses 106 (second recesses) and a plurality of linear protrusions 105 (second protrusions), which are fittingly engageable with the linear protrusions 812 and the linear recesses 813 of the output shaft 800A, respectively.

FIG. 21 is a perspective view showing a state after the output shaft 800A and the outer ring 100A are coupled together. The output shaft 800A is inserted into the housing portion 100d of the outer ring 100A in such a manner that the linear protrusions 812 are fittingly engaged with the respective linear recesses 106, and the linear recesses 813 are fittingly engaged with the respective linear protrusions 105. Thus, in the coupled state illustrated in FIG. 21, a torque about the axis of the output shaft 800A can be transmitted from the outer ring 100A to the output shaft 800A, while allowing the outer ring 100A to be slidably displaced in the axial direction of the output shaft 800A. Thus, this coupling structure may be used in place of the coupling structure based on the clutch 19 described in the fourth embodiment.

Respective configurations of the linear protrusions 812 and the linear recesses 813 of the output shaft 800A, and the linear protrusions 105 and the linear recesses 106 of the outer ring 100A, i.e., a groove/recess configuration for fitting engagement between the output shaft 800A and the outer ring 100A, may be appropriately determined. The groove/recess configuration may include a key groove configuration, a polygonal groove configuration, an angular spline configuration, and an involute spline configuration. Among them, the involute spline configuration is particularly preferable, because it has a self-centering effect capable of aligning a rotation center and the output shaft 800A with a rotation center of the outer ring 100A with a high degree of accuracy.

Fifth Embodiment

Figure 22:
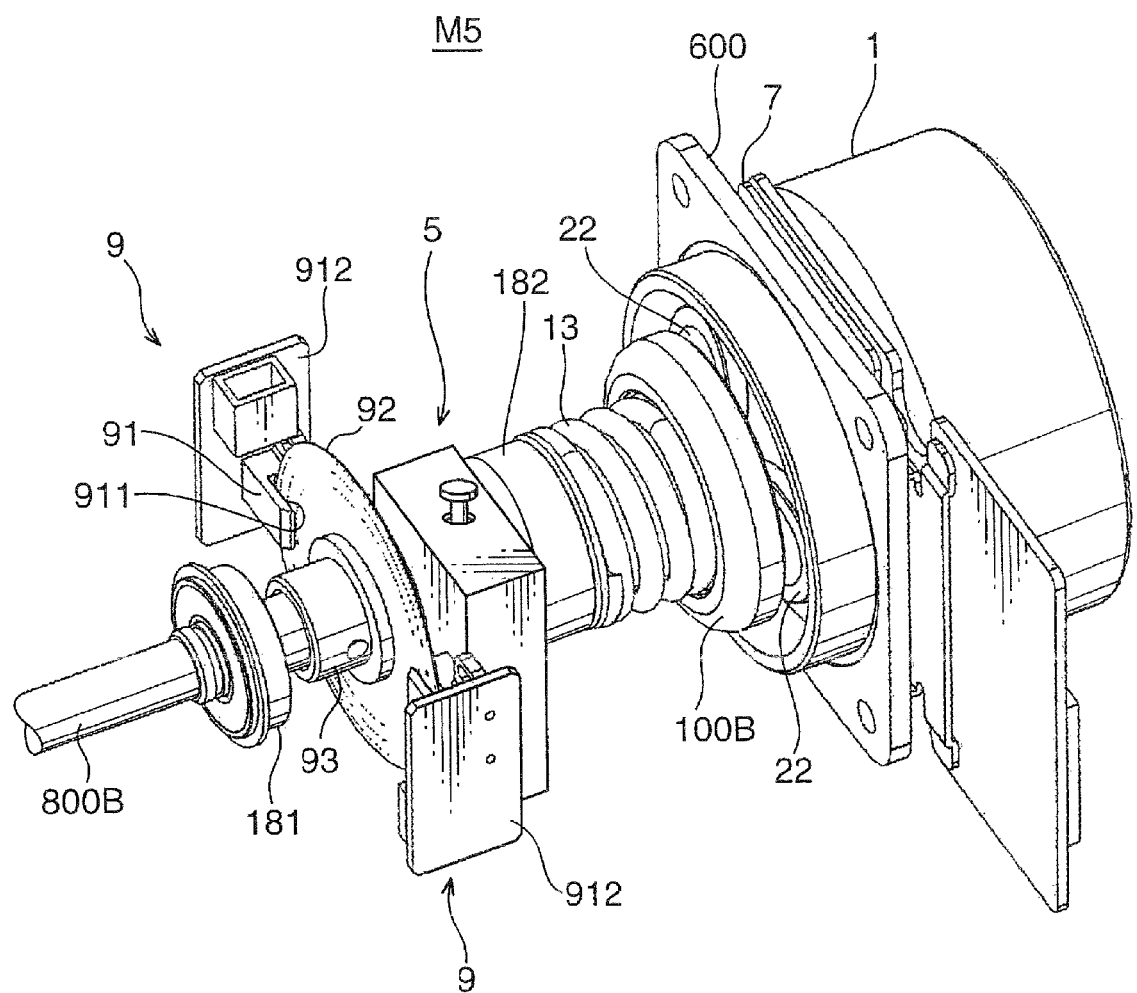
FIG. 22 is a perspective view showing a traction-drive type driving-force transmission mechanism according to a fifth embodiment of the present invention, wherein a casing is removed therefrom.
Figure 23:
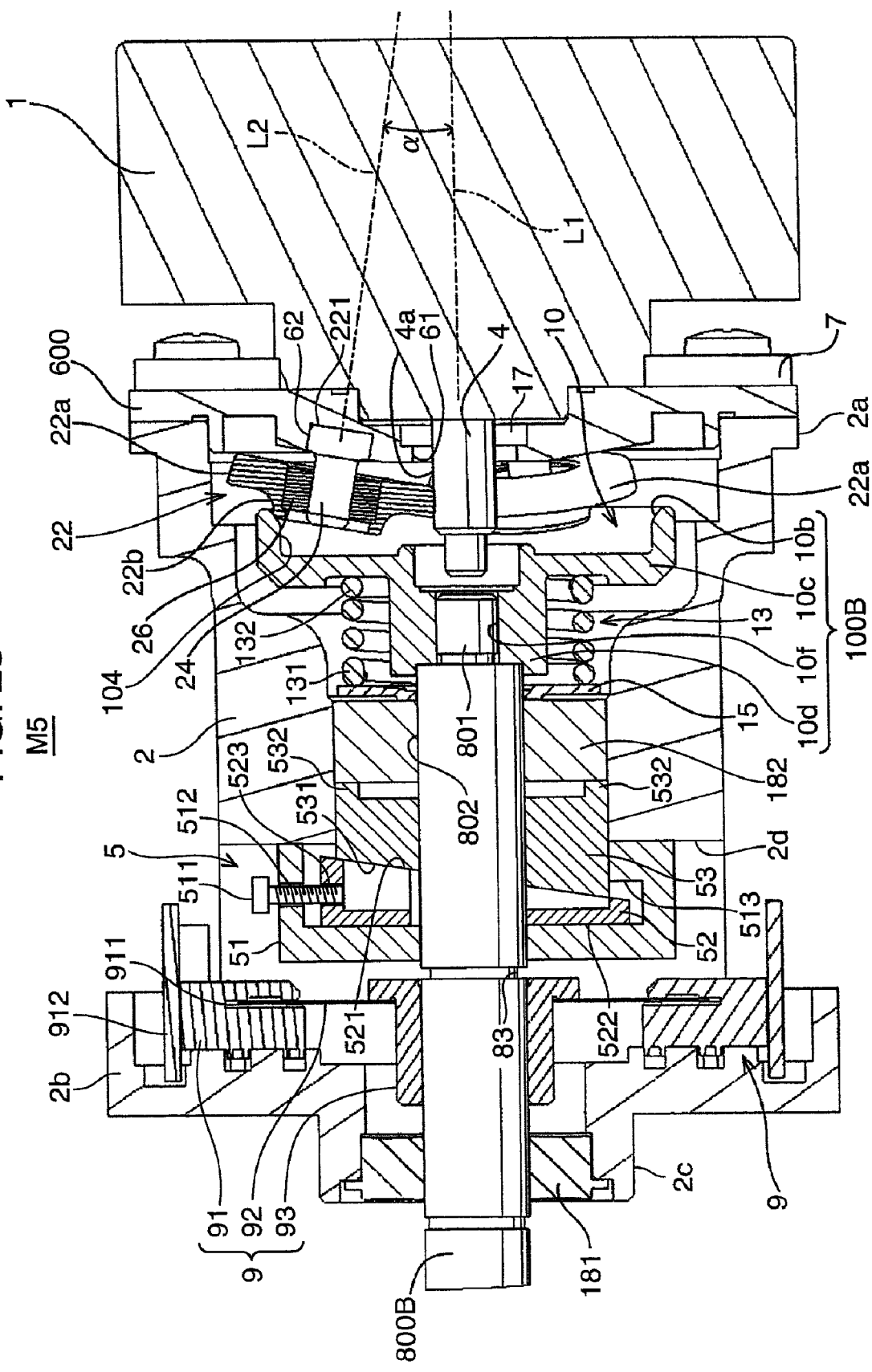
FIG. 23 is a vertical sectional view of the traction-drive type driving-force transmission mechanism according to the fifth second embodiment, taken along an axial direction thereof.

FIG. 22 is a perspective view showing a traction-drive type driving-force transmission mechanism M5 according to a fifth embodiment of the present invention, wherein a casing 2 is removed therefrom, and FIG. 23 is a vertical sectional view of the traction-drive type driving-force transmission mechanism M5, taken along an axial direction thereof.

As in the fourth embodiment, the outer ring 100 and the output shaft 800 may be coupled together in such a manner as to allow the outer ring 100 to be displaced along the axial direction of the output shaft 800, while allowing a torque to be transmitted from the outer ring 100 to the output shaft 800, so as to avoid damage of the slit plate 92 of the rotary encoder 9. However, when the outer ring 100 is displaced in the axial direction of the output shaft 800, a biasing state, i.e., a state of the compression coil spring 22 biasing the outer ring 100 to allow the outer ring 100 to press each of the speed-reduction gears 22, will be changed, and thereby a pressing force for each of the speed-reduction gears 22 will also be changed.

The change in the pressing force leads to a change in torque to be transmitted between the sun roller 4 and each of the speed-reduction gears 22, which is likely to cause a problem about change in traction drive characteristic. In the above coupling structure, the outer ring 100 is displaced toward the motor 1 by a distance equivalent to wear in the pressing surface 10b of the outer ring 100 and the pressure-receiving surface 22b of each of the speed-reduction rollers 22, and thereby a biasing force of the compression coil spring 13 relative to the outer ring 100 is reduced to cause a reduction in torque to be transmitted between the sun roller 4 and each of the speed-reduction rollers 22.

In view of the above problem, the fifth embodiment shows a traction-drive type driving-force transmission mechanism provided with an adjustment device 5 designed to adjust a biasing state of a compression coil spring 13 (bias member) relative to an outer ring 100B (pressing member). The outer ring 100B is fitted onto an output shaft 800B in an axial direction of the output shaft 800B in the same manner as the modification of the coupling structure in the fourth embodiment. The adjustment device 5 is adapted, in response to a displacement of the outer ring 100B in the axial direction, to maintain a pressing force of the outer ring 100B relative to each of three speed-reduction rollers 22 at a constant level.

The outer ring 100B is coupled to a base end 801 of the output shaft 800B in a torque-transmittable manner. The base end 801 is formed as a small-diameter portion having a diameter less that a body of the output shaft 800B. The base end 801 of the output shaft 800B is fitted into an inner peripheral surface 10f of a housing portion 10d of the outer ring 100B in such a manner as to be movable in the axial direction of the output shaft 800B. That is, the outer ring 100B is coupled to the output shaft 800B in such a manner as to be slidably displaced along the output shaft 800B while transmitting a torque of the outer ring 100B to the output shaft 800B.

In the fifth embodiment, a third bearing 182 is disposed between a spacer 15 and a pressing cylinder 53 of the adjustment device 5 in such a manner as to be movable along an outer peripheral surface 802 of the output shaft 800B in the axial direction of the output shaft 800B. The third bearing 182 has a primary roll of a bearing for the output shaft 800B. In the fifth embodiment, the third bearing 182 additionally serves as a means to slidably move the spacer 15 in response to receiving a pressing force from the pressing cylinder 53. Based on the movement of the spacer 15, a position of a second end 131 of the compression coil spring 13 on an opposite side of a first end 132 thereof in contact of a large-diameter portion 10c of the outer ring 100B is moved toward the speed-reduction rollers 22 to adjust a biasing state of the compression coil spring 13 relative to the outer ring 100B.

In the fifth embodiment, the outer peripheral surface of the output shaft 800B is formed with an engagement groove 83. For example, the engagement groove 83 is used for attaching an E-ring (not shown) to restrict a displacement of the output shaft 800B itself in the axial direction of the output shaft 800B.

Figure 24:
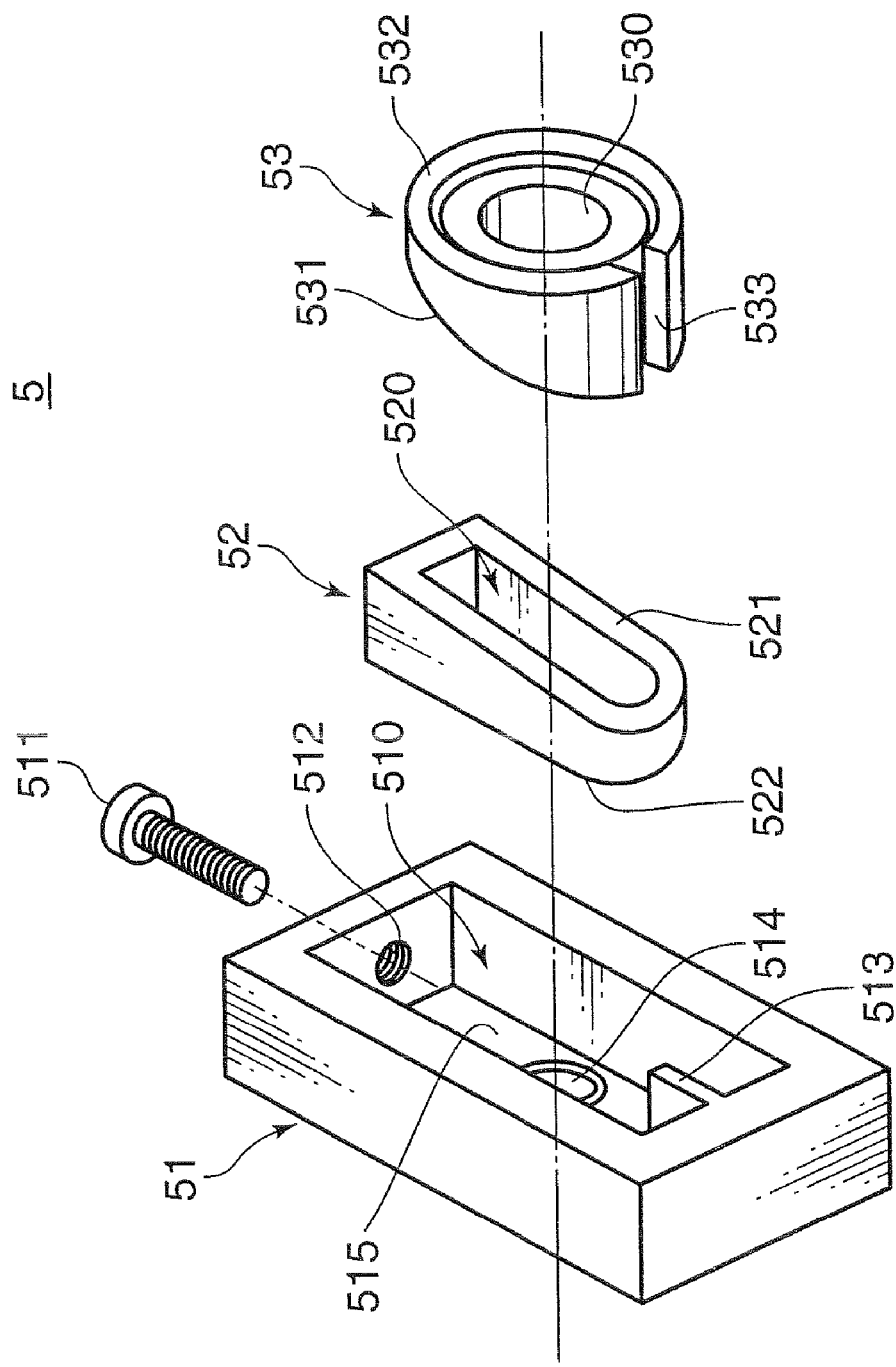
FIG. 24 is an exploded perspective view showing an adjustment device.
Figure 25:
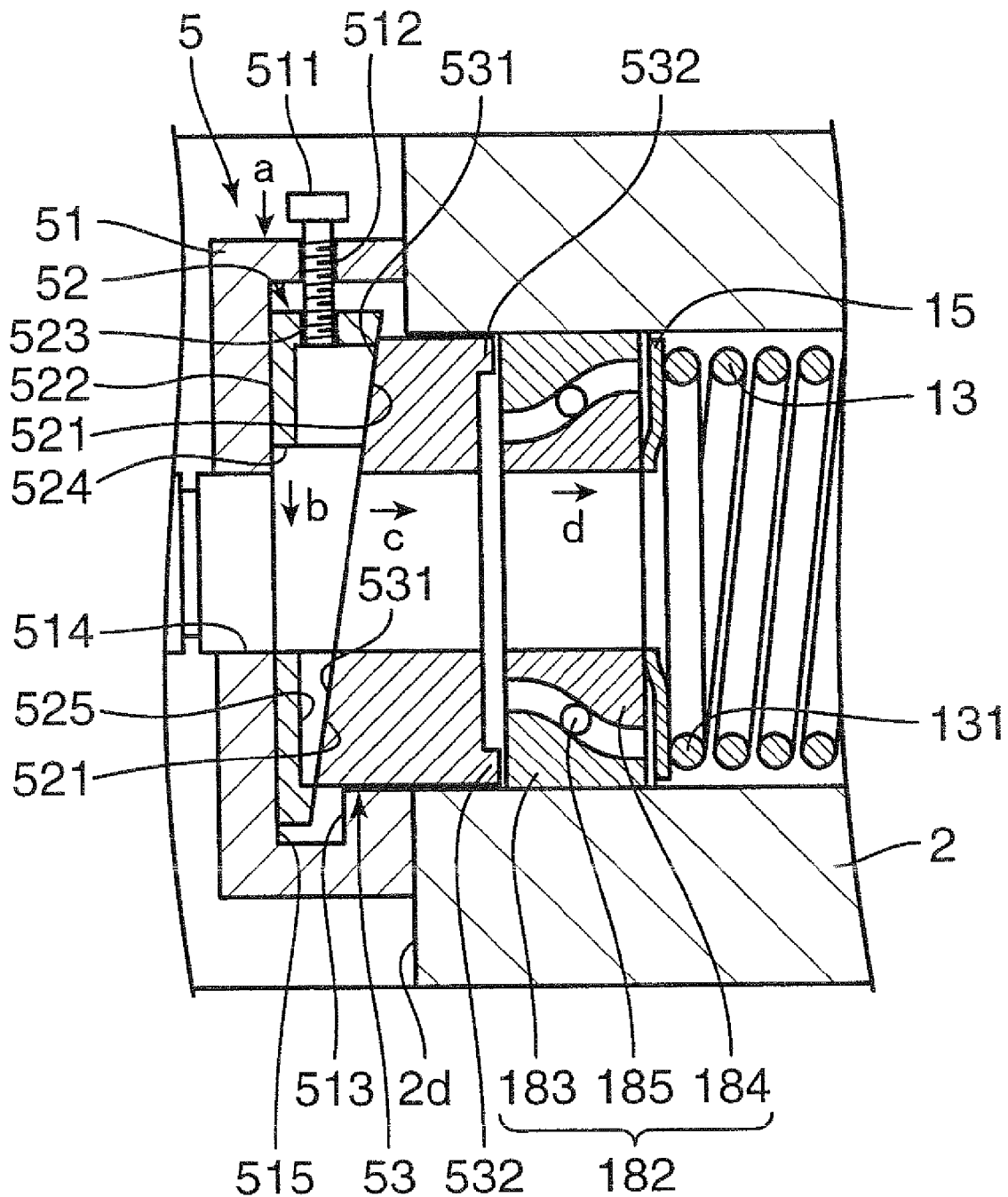
FIG. 25 is an axial sectional view showing a state after the adjustment device is assembled inside a casing.

The adjustment device 5 is disposed between a slit plate 92 and the third bearing 182 in such a manner as to adjust the biasing state of the compression coil spring 13 relative to the outer ring 100B. FIG. 24 is an exploded perspective view of the adjustment device 5, and FIG. 25 is an axial sectional view showing a state after the adjustment device 5 is assembled inside a casing 2. The adjustment device 5 comprises an anchor cap 51, a slider 52 and the pressing cylinder 53, which are arranged on the output shaft 800B in series.

The anchor cap 51 is a cubic-shaped member which has a short edge and a long edge, and is formed with a first cavity 510 opened toward an installation position of the outer ring 100B. The first cavity 510 has a volume capable of receiving the slider 52. Further, the anchor cap 51 is formed with a screw hole 512 to be screwed with an intermediate portion of a pressing force-adjusting screw member 511, a linear guide protrusion 513 for guiding an axial movement of the pressing cylinder 53, and a first shaft hole 514 for allowing the output shaft 800B to penetrate therethrough. The anchor cap 51 is fixedly attached to a mounting surface 2d of the casing 2 by a screw member (not shown) or the like.

The slider 52 is adapted to be slidingly moved in a direction orthogonal to the axial direction of the output shaft 800B within the first cavity 510. The slider 52 has a first inclined surface 521 opposed to the pressing cylinder 53, a horizontal surface 522 opposed to a first-cavity bottom wall 515 of the anchor cap 51, and a screw-member receiving hole 523 for receiving a distal end of the pressing force-adjusting screw member 511. The slider 52 is formed with a second cavity 520 opened toward the installation position of the outer ring 100B. The slider 52 has a second-cavity bottom wall 525 formed with a second shaft hole 524 for allowing the output shaft 800B to penetrate therethrough. The second shaft hole 524 is an elongate hole which has a length greater than an outer diameter of the output shaft 800B, in one direction (in FIG. 25, an upward-downward direction).

The pressing cylinder 53 is adapted to be fitted around the output shaft 800B in such a manner as to be movable in the axial direction of the output shaft 800B. The pressing cylinder 53 has a third shaft hole 530 for allowing the output shaft 800B to penetrate therethrough, a second inclined surface 531 opposed to the slider 52 and formed to have an inclination corresponding to the first inclined surface 521, an annular-shaped protrusion 532 opposed to the third bearing 182, and a linear recess 533 to be fitted onto the linear guide protrusion 513 of the anchor cap 51. In an assembled state of the adjustment device 5, the second inclined surface 531 of the pressing cylinder 53 and the first inclined surface 521 of the slider 52 are brought into contact with each other by a repulsion force of the compression coil spring 13.

The third bearing 182 is adapted to rotatably support the output shaft 800B. As shown in FIG. 25, the third bearing 182 is an angular bearing which comprises an outer race 183, an inner race 184, and bearing balls 185 held between the outer and inner races 183, 184. As shown in FIG. 25, the annular-shaped protrusion 532 of the pressing cylinder 53 is in contact with the outer race 183 of the third bearing 182, and a small-diameter portion of the spacer 15 is in contact with the inner race 184 of the third bearing 182.

In the above adjustment device 5, in response to a movement of the slider 52 in the direction orthogonal to the axial direction of the output shaft 800B, the pressing cylinder 53 is moved in a direction toward the installation position of the outer ring 100B, and thus the spacer 15 supporting the second end 131 of the compression coil spring 13 is moved by the pressing cylinder 53 through the third bearing 182. According to the movement of the spacer 15, the second end 131 of the compression coil spring 13 is moved toward the outer ring 100B, to allow a biasing force of the compression coil spring 13 relative to the outer ring 100B to be increased.

More specifically, when the pressing force-adjusting screw member 511 screwed into the screw hole 512 is turned and moved in a direction toward the output shaft 800B as indicated by the arrowed line a in FIG. 25, the screw-member receiving hole 523 of the slider 52 is pressed and moved in a direction indicated by the arrowed line b in FIG. 25. During this operation, the horizontal surface 522 of the slider 52 is in contact with the first-cavity bottom wall 515 of the anchor cap 51 fixed to the casing 2, and the first inclined surface 521 of the slider 52 is in contact with the second inclined surface 531 of the pressing cylinder 53 biased by the repulsion force of the compression coil spring 13. Thus, when the slider 52 is forcedly moved in the direction indicated by the arrowed line b, the second inclined surface 531 is pressed by the first inclined surface 521, to move the pressing cylinder 53 in a direction indicated by the arrowed line c in FIG. 25, against the repulsion force of the compression coil spring 13.

According to the movement of the pressing cylinder 53 in the direction indicated by the arrowed line c, the annular-shaped protrusion 532 presses the outer race 183 of the third bearing 182 to move the third bearing 182 in a direction indicated by the arrowed line d in FIG. 25. Thus, the spacer 15 is moved on the output shaft 800B, and the second end 131 of the compression coil spring 13 is moved toward the outer ring 100B.

Therefore, even if the outer ring 100B is displaced toward the motor 1 due to wear in a pressing surface 10b of the outer ring 100B and a pressure-receiving surface 22b of each of the speed-reduction rollers 22, and thereby the biasing force of the compression coil spring 13 relative to the outer ring 100B is reduced, the pressing force-adjusting screw member 511 can be appropriately turned to displace the spacer 15 by a distance corresponding to the displacement due to the wear, so as to restore the biasing force. This makes it possible to maintain the traction drive characteristic in an initial setting state.

Figure 26:
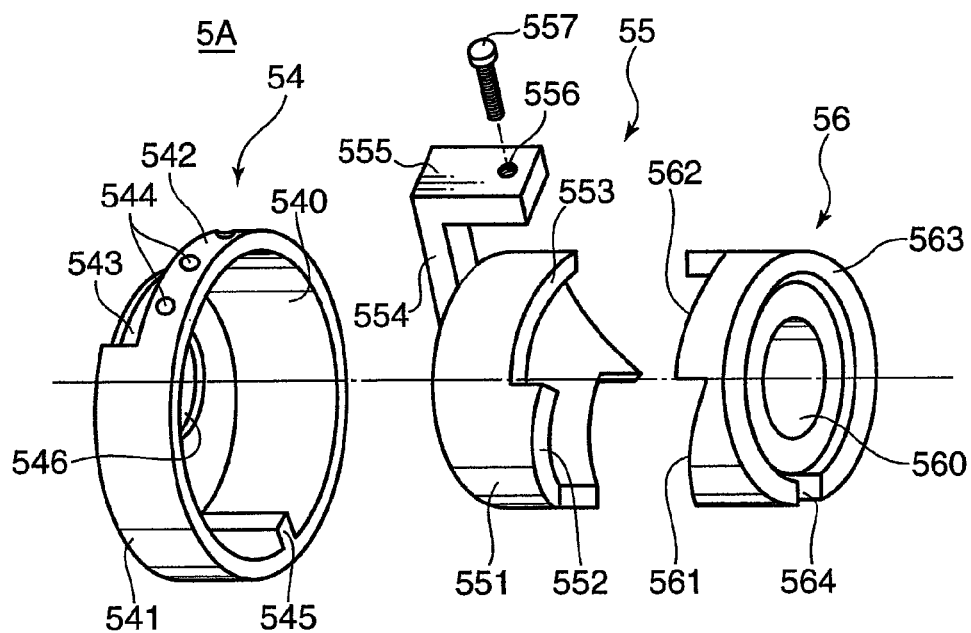
FIG. 26 is an exploded perspective view showing one example of modification of the adjustment device in the fifth embodiment.
Figure 27A:
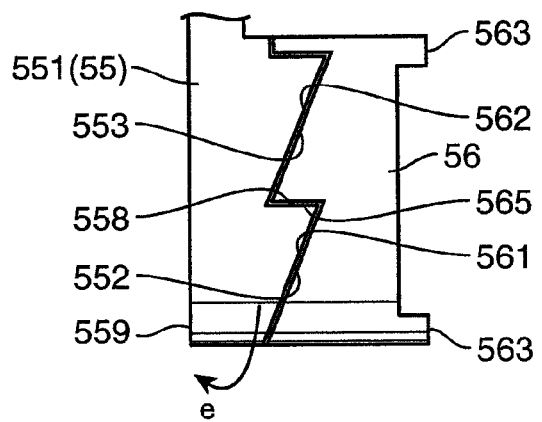
FIGS. 27A and 27B are explanatory side views of an operation of the adjustment device in FIG. 26.
Figure 27B:
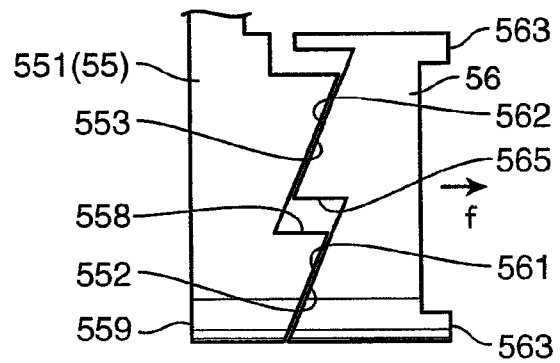
Figure 28:
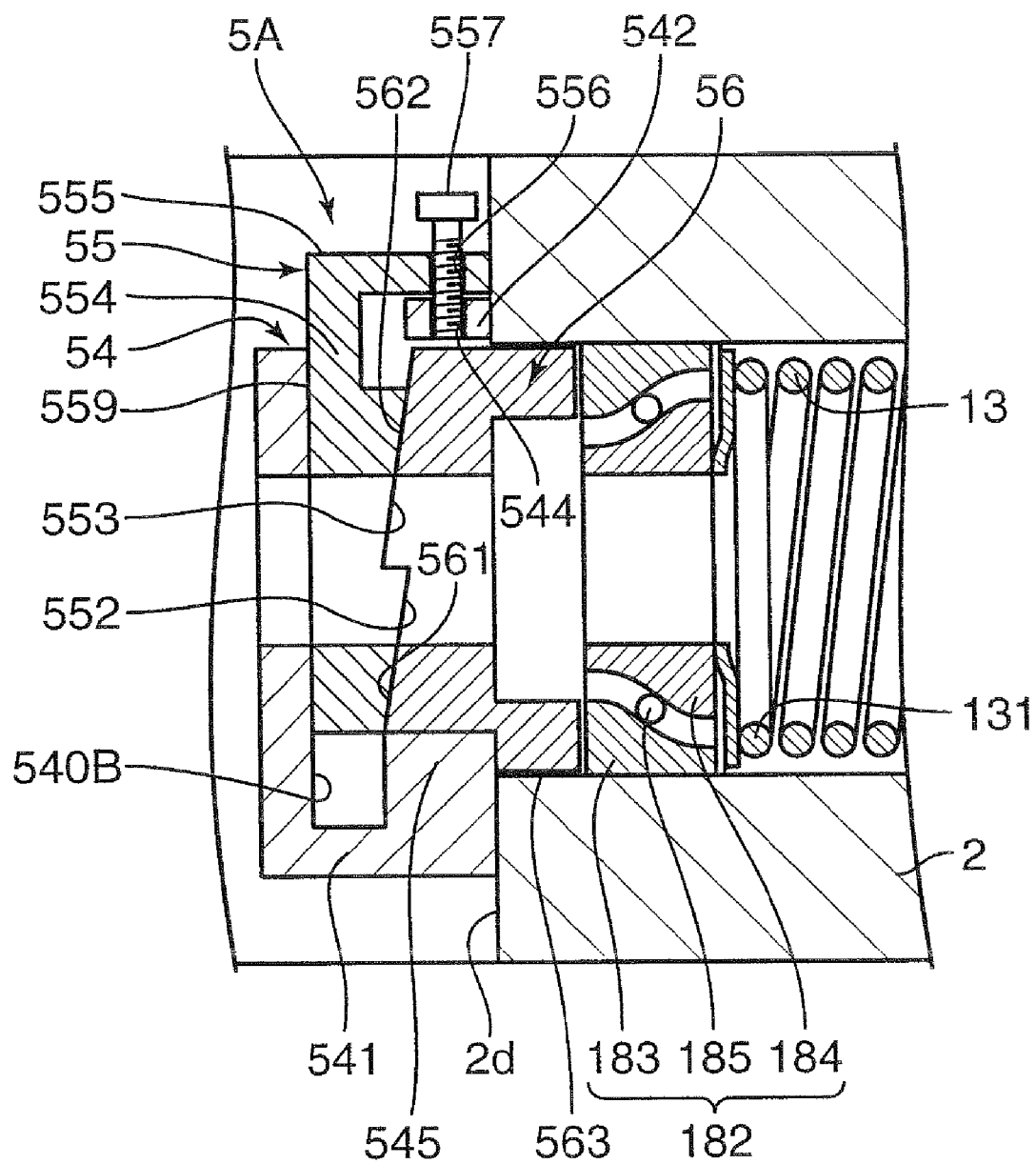
FIG. 28 is an axial sectional view showing a state after the adjustment device in FIG. 26 is assembled inside the casing.

An adjustment device 5A as one example of modification of the adjustment device in the fifth embodiment will be described below. FIG. 26 is an exploded perspective view of the adjustment device 5A. FIGS. 27A and 27B are explanatory side views of an operation of the adjustment device 5A, and FIG. 28 is an axial sectional view showing a state after the adjustment device 5A is assembled inside the casing 2.

The adjustment device 5A comprises a second anchor cap 54, a rotary slider 55 and a second pressing cylinder 56, which are arranged on the output shaft 800B in series. The aforementioned adjustment device 5 is shown as an example where the slider 52 is linearly moved in the direction orthogonal to the axial direction of the output shaft 800B. The adjustment device will be shown as another example where the rotary slider 55 is rotationally moved about the axial direction of the output shaft 800B.

The second anchor cap 54 is a cylindrical-shaped member which has a cylindrical wall 541 and a bottom wall 540B, and is formed with a third cavity 540 opened toward the installation position of the outer ring 100B. The cylindrical wall 541 has a slit 543 formed by partly cutting it in a circumferential direction thereof, and a plurality of second screw holes 544 formed in a narrowed portion 542 having a width narrowed as the result of the slit 543 and arranged in the circumferential direction at certain intervals. The cylindrical wall 541 also has a second linear protrusion 545 formed on an inner peripheral surface thereof to guide an axial movement of the second pressing cylinder 56, and a fourth shaft hole 546 formed in the bottom wall 540B to allow the output shaft 8 to penetrate therethrough. The second anchor cap 54 is fixedly attached to the mounting surface 2d by a screw member (not shown) or the like.

The rotary slider 55 has a slider body 551 to be received in the third cavity 540 of the second anchor cap 54, an arm portion 554 extending from the slider body 551, and a head portion 555 provided at a distal edge of the arm portion 554. The slider body 551 is a semi-cylindrical-shaped member which has a first inclined arc surface 552 and a second inclined arc surface 553 disposed in stepped relation to each other and connected to the second pressing cylinder 56 in opposed relation thereto. The arm portion 554 is formed to penetrate the slit 543 of the second anchor cap 54. The head portion 555 is formed to protrude outwardly beyond an edge of an outer peripheral surface of the cylindrical wall 541 and have a third screw hole 556. In a state after the second anchor cap 54 and the rotary slider 55 together, the third screw hole 556 is aligned with one of the second screw holes 544, and a fixing screw member 557 is screwed into the third and second screw holes 556, 544.

The second pressing cylinder 56 is adapted to be fitted around the output shaft 800B in such a manner as to be movable in the axial direction of the output shaft 800B. The second pressing cylinder 56 has a fifth shaft hole 560 for allowing the output shaft 800B to penetrate therethrough, a third inclined arc surface 562 and a fourth inclined arc surface 563 (contact surfaces) opposed to the rotary slider 55 and formed to have respective inclinations corresponding to the first inclined arc surface 552 and the second inclined arc surface 553, an annular-shaped protrusion 563 opposed to the third bearing 182, and a linear guide recess 564 adapted to be fitted onto the second guide protrusion 545 of the second anchor cap 51. In an assembled state of the adjustment device 5A, the first and second inclined arc surfaces 552, 553 of the rotary slider 55 and the third and fourth inclined arc surfaces 561,562 of the second pressing cylinder 56 are brought into contact with each other by the repulsion force of the compression coil spring 13.

In the above adjustment device 5A, a state when the first inclined arc surface 552 of the rotary slider 55 and the third inclined arc surface 561 of the second pressing cylinder 56, and the second inclined arc surface 553 of the rotary slider 55 and the fourth inclined arc surface 562 of the second pressing cylinder 56, are in contact with each other over the respective overall lengths thereof as shown in FIG. 27A, corresponds to a state when the rotary slider 55 and the second pressing cylinder 56 are located in closest relation to each other. In this state, a distance between a first step 558 formed at the boundary of the first and second inclined arc surfaces 552, 553 of the rotary slider 55, and a second step 565 formed at the boundary of the third and fourth inclined arc surfaces 562, 563 of the second pressing cylinder 56 is also minimal.

When the slider body 551 is rotated from the above position, about the axial direction of the output shaft 800B in a direction indicated by the arrowed line e, the third and fourth inclined arc surfaces 561,562 are guided by the respective first and second inclined arc surfaces 552, 553, in such a manner as to allow the first step 558 and the second step 565 to be moved away from each other, as shown in FIG. 27B. During this operation, a back surface 559 of the rotary slider 55 is in contact with the back wall 540B of the second anchor cap 54, and therefore an axial position of the rotary slider 55 is not changed. Thus, the second pressing cylinder 56 is moved in a direction indicated by the arrowed line f (the axial direction of the output shaft 800B).

In an operation of adjusting the biasing force of the compression coil spring 13 relative to the outer ring 100B, a user manually rotates the second anchor cap 54 to select a new one of the second screw holes 544 to be aligned with the third screw hole 556, and then fixedly fasten the rotary slider 55 and the second anchor cap 54 together by the fixing screw member 557. An arrangement pitch of the second screw holes 544 is selected depending on a setting ability to move the second pressing cylinder 56. For example, give that a distance from the position in FIG. 27A to the position in FIG. 27B is a minimum value, the pitch of the second screw holes 544 may be set based on the minimum value.

According to the movement of the second pressing cylinder 56 in the direction indicated by the arrowed line f, the annular-shaped protrusion 563 presses the outer race 183 of the third bearing 182 to move the third bearing 182. Thus, the spacer 15 is moved on the output shaft 800B, and the second end 131 of the compression coil spring 13 is moved toward the outer ring 100B. Thus, the adjustment device 5A can adjust the biasing force of the compression coil spring 13 in the same manner as that in the aforementioned adjustment device 5.

In the traction-drive type driving-force transmission mechanism M5 according to the fifth embodiment, the biasing state of the compression coil spring 13 relative to the outer ring 100B can be adjusted by the adjustment device 5 (or 5A). This makes it possible to maintain the traction drive characteristic between the sun roller 4 and each of the speed-reduction rollers 22, in an initial setting state.

[Embodiment as Image Forming Apparatus]

Figure 29:
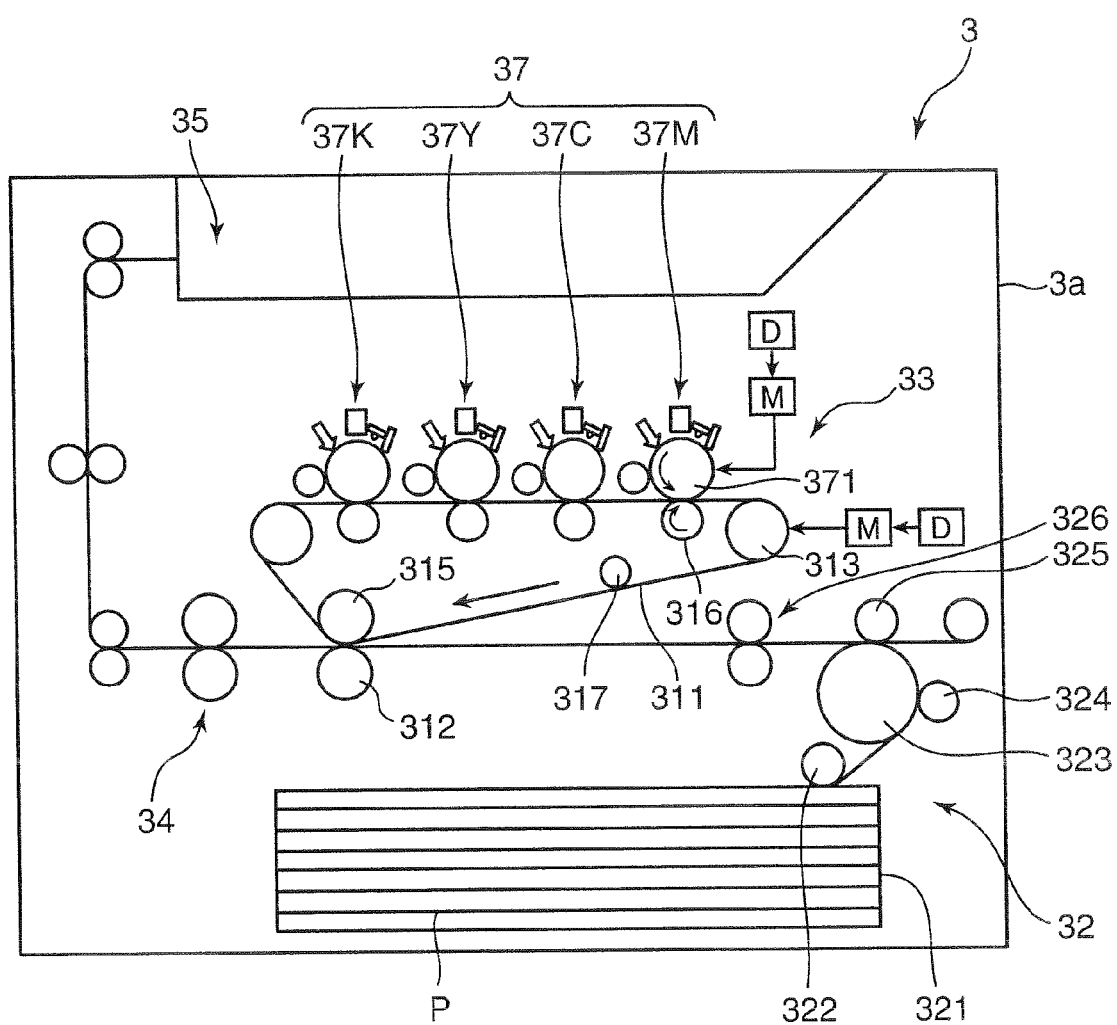
FIG. 29 is a schematic sectional view showing one example of an image forming apparatus according to one embodiment of the present invention.

As one example of an apparatus suitably equipped with the aforementioned traction-drive type driving-force transmission mechanism (M to M5), a full-color image forming apparatus can be represented. FIG. 29 is a schematic sectional view showing a general structure of a tandem-type color printer 3 as one example of the full-color image forming apparatus.

The color printer 3 comprises a sheet feed section 32 operable to feed a sheet P, an image forming section 33 operable to transfer an image onto the sheet P while transporting the sheet P fed from the sheet feed section 32, and a fixing section 34 operable to subject the image transferred on the sheet P in the image forming section 33 to a fixing process, which are housed in a box-shaped apparatus body 3a thereof. The apparatus body 3a has an upper surface formed as a catch tray section 35 adapted to receive the sheet P after being subjected to the fixing process in the fixing section 34.

The sheet feed section 32 is provided with a sheet feed cassette 321 adapted to store therein a plurality of sheets P, a pickup roller 322, three sheet feed rollers 323, 324, 325, and a registration roller 326. The image forming section 33 is provided with an image forming unit 37, an intermediate transfer belt 311 adapted to allow a toner image to be primarily transferred onto a surface thereof by the image forming unit 37, and a secondary transfer roller 312 operable to secondarily transfer the toner image on the intermediate transfer belt 311, onto the sheet P sent from the sheet feed cassette 321.

The image forming unit 37 includes a black unit 37K, a yellow unit 37Y, a cyan unit 37C and a magenta unit 37M, which are disposed from an upstream side (left side in FIG. 29) to an downstream side, in this order. Each of the units 37K, 37Y, 37C, 37M has a photosensitive drum 371 disposed at a central position thereof to serve as an image support member. The photosensitive drum 371 is adapted to be drivenly rotated in a counterclockwise direction in FIG. 29. A charger unit, an exposure unit, a developing unit, a cleaning unit and an eraser unit are disposed around the photosensitive drum 371 from an upstream side of a rotation direction of the photosensitive drum 371, in this order.

The intermediate transfer belt 311 comprises an endless belt-shaped rotatable member wound around a drive roller 331, a belt support roller 314, a backup roller 315, four primary transfer rollers 316 and a tension roller 317, in such a manner that an outer surface thereof is kept in contact with outer peripheral surfaces of the respective photosensitive drums 371 of the units 37K, 37Y, 37C, 37M. The intermediate transfer belt 311 is adapted to be endlessly rotated by the plurality of rollers while being pressed against each of the photosensitive drums 371 by a corresponding one of the primary transfer rollers 316 which are disposed in opposed relation to the respective photosensitive drums 371.

Toner images formed on the respective photosensitive drums 371 are sequentially transferred (primarily transferred) onto the intermediate transfer belt 311 circulatingly rotated in the arrowed direction (clockwise direction) according to driving of the drive roller 313, in a superimposed manner, to form a full-color toner image. This full-color toner image is secondarily transferred onto the sheet P in a nip zone defined between the secondary transfer roller 312 and the backup roller 315. The sheet P having the full-color toner image transferred thereon is subjected to the fixing process in the fixing section 34, and then ejected to the catch tray section 35.

In the above color printer 3, the aforementioned traction-drive type driving-force transmission mechanism (M to M5) may be connected to a driving system for a component to be drivenly rotated. Particularly, the traction-drive type driving-force transmission mechanism (M to M5) is preferably applied to a driving component for the image forming section 33, such as the photosensitive drum 371 and/or the intermediate transfer belt 311. A rotational driving force of a motor D (serving as a driving source) may be transmitted to a rotary shaft (serving as a driving component) of the photosensitive drum 371 or the drive roller 313 (serving as a driving component) operable to drive the intermediate transfer belt 311, through the traction-drive type driving-force transmission mechanism (M to M5). In this case, as compared with gear drive, transmission loss and uneven driving can be suppressed to achieve higher-quality image forming. Further, a stepping motor may be used as the motor. In this case, according to a pulse control of the stepping motor, a rotational angle of the photosensitive drum 371 or the like can be controlled with a high degree of accuracy to achieve significant high-quality image forming.

The above specific embodiments primarily include the invention having the following features.

In one aspect of the present invention, there is provided a traction-drive type driving-force transmission mechanism, which comprises: an output shaft; a sun roller having a first central axis and being rotatable about the first central axis; a plurality of shaft members having respective second central axes and being disposed respectively on corresponding ones of a plurality of secondary axes each inclined relative to the first central axis by a predetermined angle, in such a manner that each of the second central axes is aligned with the corresponding secondary axis; a plate member which holds each of the shaft members in the posture inclined by the predetermined angle; a plurality of speed-reduction rollers each disposed along an outer peripheral surface of the sun roller while being supported by a corresponding one of the shaft members; and a pressing member coupled to the output shaft, and adapted to press each of the speed-reduction rollers against the outer peripheral surface of the sun roller to allow a driving force to be transmitted through means of a traction force between the sun roller and the speed-reduction roller.

In the above traction-drive type driving-force transmission mechanism of the present invention, a traction force can be generated by pressing each of the speed-reduction gears from only one side. Thus, the traction-drive type driving-force transmission mechanism can be made up using a less number of components. In addition, during an assembling operation for the traction-drive type driving-force transmission mechanism, a process of moving the sun roller while maintaining contact between the sun roller and each of the speed-reduction gears can be eliminated. This makes it possible to facilitate the assembling operation, and prevent occurrence of scratch or abrasion on the sun roller and the speed-reduction rollers, which contributes to obtaining a long-lifetime traction-drive type driving-force transmission mechanism. The easily-assembled structure can also be easily disassembled, so that a service person can readily perform a maintenance operation for the traction-drive type driving-force transmission mechanism.

Preferably, in the traction-drive type driving-force transmission mechanism of the present invention, the pressing member is adapted to press each of the speed-reduction rollers in a direction causing a reduction in a distance between the speed-reduction roller and the first central axis when viewed on the corresponding secondary axis. According to this feature, a traction force can be more adequately generated between the sun roller and each of the speed-reduction rollers.

Preferably, in the traction-drive type driving-force transmission mechanism of the present invention, each of the speed-reduction rollers is adapted to be slidably moved on the corresponding shaft member. According to this feature, a movement of each of the speed-reduction rollers can be restricted to a movement on the corresponding secondary axis along the corresponding shaft member to reliably prevent the rotation axis of the speed-reduction roller from deviating from the shaft member (secondary axis). This makes it possible to maintain each of the speed-reduction rollers in a desired posture to reliably prevent occurrence of edge contact.

Preferably, the above traction-drive type driving-force transmission mechanism further comprises a plurality of first bearings each supporting a respective one of the speed-reduction rollers rotatably about the corresponding shaft member, wherein each of the first bearings is adapted, when a pressing force is applied from the pressing member to the speed-reduction roller, to be moved on the corresponding shaft member along the corresponding secondary axis together with the speed-reduction roller.

More preferably, the above traction-drive type driving-force transmission mechanism further comprises a bias member which biases the pressing member in a direction causing the pressing member to come closer to each of the speed-reduction rollers, wherein the pressing member has a pressing surface adapted to press each of the speed-reduction rollers toward the sun roller, and each of the speed-reduction rollers has a pressure-receiving surface adapted to be pressed by the pressing surface, wherein each of the speed-reduction rollers is adapted, when the pressure-receiving surface is pressed by the pressing surface of the biased pressing member, to be infinitesimally moved on the shaft member thereof.

According to this feature, each of the speed-reduction rollers is supported by the corresponding shaft member through the first bearing. This makes it possible to more smoothly rotate each of the speed-reduction rollers. In addition, the bearing is moved relative to the shaft member together with the speed-reduction roller according to a pressing force from the pressing member. This makes it possible to generate an adequate traction force between the sun roller and each of the speed-reduction rollers.

Preferably, in the traction-drive type driving-force transmission mechanism of the present invention, the secondary axes are arranged to extend so as to intersect with each other at a single common point on the first central axis, while allowing the shaft members to be disposed thereon, respectively. According to this feature, each of the speed-reduction rollers can be pressed against the sun roller under the same condition.

Preferably, in the traction-drive type driving-force transmission mechanism of the present invention, the pressing member has a pressing surface adapted to press each of the speed-reduction rollers toward the sun roller in such a manner that a first load vector directing from the pressing surface toward any one of the shaft members, and a second load vector directing from the outer peripheral surface of the sun roller toward the one shaft member, intersect with each other at one point within the one shaft member. More preferably, the first and second load vectors intersect with each other on the second central axis of the one shaft member.

According to this feature, a bending moment to be applied to the shaft member can be minimized to extend a usable life of the shaft member.

Preferably, in the traction-drive type driving-force transmission mechanism of the present invention, each of three components consisting of the sun roller, the speed-reduction roller and the pressing member to be brought into press contact with each other is made of a material having a hardness set to become higher in descending order of surface velocity in respective press contact portions of the components.

According to this feature, as compared with a case where the three components are made of the same material, performance deterioration due to seizing or wearing can be suppressed to provide a long-lifetime traction-drive type driving-force transmission mechanism.

Preferably, in the traction-drive type driving-force transmission mechanism of the present invention, each of three components consisting of the sun roller, the speed-reduction roller and the pressing member to be brought into press contact with each other is made of a material having a hardness equal to or greater than that of at least die steel, and at least one of the components to be driven at a maximum value of surface velocity in respective press contact portions thereof has a surface subjected to a micro-shot peening treatment.

According to this feature, as compared with a case where the component is not subjected to the micro-shot peening treatment, performance deterioration due to wearing can be suppressed to provide a long-lifetime traction-drive type driving-force transmission mechanism.

Preferably, in the traction-drive type driving-force transmission mechanism of the present invention, the pressing member and the output shaft are coupled to each other by means of screwing, wherein the output shaft is coupled to the pressing member in such a manner as to be screwed with the pressing member in a direction causing an increase in a screw tightening force in a driven state thereof. According to this feature, the output shaft is screwed with the pressing member in the direction causing an increase in a screw tightening force in a driven state thereof. This makes it possible to reliably maintain the connection between the pressing member and the output shaft.

Preferably, the traction-drive type driving-force transmission mechanism of the present invention further comprises a driving source adapted to drivingly rotate the sun roller, wherein a drive unit including the driving source and the sun roller, a speed-reduction unit including the plate member, the shaft members and the speed-reduction rollers, and a pressing unit including the pressing member, are assembled together in such a manner as to be separable from each other on a unit-by-unit basis. Preferably, this traction-drive type driving-force transmission mechanism further comprises a speed sensing unit adapted to sense a rotational speed of the output shaft, wherein the speed sensing unit is separable relative to the pressing unit.

According to this feature, the drive unit, the speed-reduction unit, the pressing unit and the speed sensing unit, can be disassembled from each other on a unit-by-unit basis. This makes it possible to facilitate replacement of a component in each of the drive unit, the speed-reduction unit, the pressing unit and the speed sensing unit, so that a service person can readily perform a maintenance operation for each of the units.

Preferably, the traction-drive type driving-force transmission mechanism of the present invention further comprises a second bearing which rotatably supports the output shaft, a bias member disposed between the pressing member and the second bearing to bias the pressing member in a direction causing the pressing member to press each of the speed-reduction rollers, and a spacer having one surface in contact with the second bearing, and the other surface in contact with the bias member.

According to this feature, a biasing force of the bias member can be reliably applied to the second bearing. This makes it possible to avoid damage of the second bearing to obtain a long-lifetime traction-drive type driving-force transmission mechanism.

Preferably, the traction-drive type driving-force transmission mechanism of the present invention further comprises a slit plate fixed to the output shaft, and an optical sensor device adapted to emit and receive light across the slit plate which is being rotated in conjunction with rotation of the output shaft, wherein the pressing member and the output shaft are coupled to each other in such a manner as to transmit a torque from the pressing member to the output shaft while allowing the pressing member to be displaced along an axial direction of the output shaft in a direction causing the pressing member to press each of the speed-reduction rollers.

According to this feature, the pressing member and the output shaft are coupled to each other in such a manner as to transmit a torque while allowing the pressing member to be displaced along an axial direction of the output shaft. Thus, even if the pressing member is displaced in a direction causing it to press each of the speed-reduction rollers, a positional relationship between the slit plate and the optical sensor device can be maintained. This makes it possible to prevent occurrence of contact between the optical sensor device and the slit plate.

As one preferred structure, the above traction-drive type driving-force transmission mechanism may further comprise a clutch adapted to selectively couple between the pressing member and the output shaft, wherein the pressing member has a housing portion capable of receiving therein a part of the output shaft, and the clutch is fixedly attached to an inner peripheral surface of the housing portion, and fitted on the output shaft in such a manner as to be slidably moved relative to the output shaft in the axial direction of the output shaft.

According to this feature, a torque from the pressing member can be transmitted to the output shaft through the clutch, and the clutch allows the pressing member to be slidingly displaced relative to the output shaft in the axial direction of the output shaft. This makes it possible to stably maintain a positional relationship between the slit plate and the optical sensor device.

As another preferred structure, in the above traction-drive type driving-force transmission mechanism, the pressing member may have a housing portion capable of receiving therein a portion of the output shaft, wherein at least the portion of the output shaft is formed with a first linear protrusion or recess extending in the axial direction of the output shaft, and the housing portion has an inner wall formed with a second linear recess or protrusion fittingly engageable with the first linear protrusion or recess.

According to this feature, a torque from the pressing member can be transmitted to the output shaft through fitting engagement between the first linear protrusion and the second linear recess, or the first linear recess and the second linear protrusion, and the second linear recess or protrusion of the inner wall of the housing portion allows the pressing member to slidingly displaced along the first linear protrusion or recess of the output shaft. This makes it possible to stably maintain a positional relationship between the slit plate and the optical sensor device.

Preferably, the traction-drive type driving-force transmission mechanism of the present invention further comprises a bias member which biases the pressing member in a direction causing the pressing member to press each of the speed-reduction rollers, a slit plate fixed to the output shaft, an optical sensor device adapted to emit and receive light across the slit plate which is being rotated in conjunction with rotation of the output shaft, and an adjustment device adapted to adjust a biasing state of the bias member relative to the pressing member, wherein the pressing member is fitted onto the output shaft in such a manner as to be displaceable in an axial direction of the output shaft, and the adjustment device is adapted, in response to a displacement of the pressing member in an axial direction of the output shaft, to maintain a pressing force of the pressing member relative to each of the speed-reduction rollers at a constant level.

According to this feature, the pressing member is fitted onto the output shaft in such a manner as to be displaceable in an axial direction of the output shaft. Thus, even if the pressing member is displaced in the axial direction of the output shaft, a positional relationship between the slit plate and the optical sensor device can be stably maintained. This makes it possible to prevent occurrence of contact between the optical sensor device and the slit plate. Further, the adjustment device is adapted to adjust a biasing state of the bias member relative to the pressing member. Thus, in response to a displacement of the pressing member, a pressing force of the pressing member relative to each of the speed-reduction rollers can be adjusted. This makes it possible to maintain a traction drive characteristic between the sun roller and each of the speed-reduction rollers, in an initial setting state.

In another aspect of the present invention, there is provided an image forming apparatus, which comprises: an image forming section including at least a photosensitive drum, or a photosensitive drum and an intermediate transfer belt; a driving source operable to generate a driving force for driving the photosensitive drum, or at least one of the photosensitive drum and the intermediate transfer belt; and a traction-drive type driving-force transmission mechanism operable to transmit the driving force of the driving source to a rotary shaft of the photosensitive drum, or a driving member of the intermediate transfer belt. The traction-drive type driving-force transmission mechanism includes: an output shaft; a sun roller having a first central axis and being rotatable about the first central axis; a plurality of shaft members having respective second central axes and being disposed respectively on corresponding ones of a plurality of secondary axes each inclined relative to the first central axis by a predetermined angle, in such a manner that each of the second central axes is aligned with the corresponding secondary axis; a plate member which holds each of the shaft members in the posture inclined by the predetermined angle; a plurality of speed-reduction rollers each disposed along an outer peripheral surface of the sun roller while being supported by a corresponding one of the shaft members; and a pressing member coupled to the output shaft, and adapted to press each of the speed-reduction rollers against the outer peripheral surface of the sun roller to allow a driving force to be transmitted through means of a traction force between the sun roller and the speed-reduction roller.

In the image forming apparatus of the present invention, the traction-drive type driving-force transmission mechanism is connected to a driving system of the photosensitive drum and/or the intermediate transfer belt. This makes it possible to rotationally control the photosensitive drum and/or the intermediate transfer belt with a higher degree of accuracy as compared with gear drive, so as to achieve higher-quality image forming.

This application is based on patent application Nos. 2007-294294, 2007-294295, 2007-294296, 2007-294297, 2007-294298, 2007-294299, 2007-294300, 2008-148941 and 2008-198942 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A traction-drive type driving-force transmission mechanism comprising:
    an output shaft;
    a sun roller having a first central axis and being rotatable about said first central axis;
    a plurality of shaft members having respective second central axes and being disposed respectively on corresponding ones of a plurality of secondary axes each inclined relative to said first central axis by a predetermined angle, in such a manner that each of said second central axes is aligned with said corresponding secondary axis;
    a plate member which holds each of said shaft members in said posture inclined by said predetermined angle;
    a plurality of speed-reduction rollers each disposed along an outer peripheral surface of said sun roller while being supported by a corresponding one of said shaft members; and
    a pressing member coupled to said output shaft and contacting each of the speed reduction rollers for directly pressing each of said speed-reduction rollers against the outer peripheral surface of said sun roller to allow a driving force to be transmitted through means of a traction force between said sun roller and each of said speed-reduction rollers.

2. The traction-drive type driving-force transmission mechanism as defined in claim 1, wherein said pressing member is adapted to press each of said speed-reduction rollers in a direction causing a reduction in a distance between said speed-reduction roller and said first central axis when viewed on said corresponding secondary axis.

3. The traction-drive type driving-force transmission mechanism as defined in claim 1, wherein each of said speed-reduction rollers is adapted to be slidably moved on said corresponding shaft member.

4. The traction-drive type driving-force transmission mechanism as defined in claim 3, which further comprises a plurality of first bearings each supporting a respective one of said speed-reduction rollers rotatably about said corresponding shaft member, each of said first bearings being adapted, when a pressing force is applied from said pressing member to said speed-reduction roller, to be moved on said corresponding shaft member along said corresponding secondary axis together with said speed-reduction roller.

5. The traction-drive type driving-force transmission mechanism as defined in claim 4, which further comprises a bias member which biases said pressing member in a direction causing said pressing member to come closer to each of said speed-reduction rollers, wherein:
    said pressing member has a pressing surface adapted to press each of said speed-reduction rollers toward said sun roller; and
    each of said speed-reduction rollers has a pressure-receiving surface adapted to be pressed by said pressing surface, each of said speed-reduction rollers being adapted, when said pressure-receiving surface is pressed by said pressing surface of said biased pressing member, to be infinitesimally moved on said shaft member thereof.

6. The traction-drive type driving-force transmission mechanism as defined in claim 1, wherein said secondary axes are arranged to extend so as to intersect with each other at a single common point on said first central axis, while allowing said shaft members to be disposed thereon, respectively.

7. The traction-drive type driving-force transmission mechanism as defined in claim 1, wherein said pressing member has a pressing surface adapted to press each of said speed-reduction rollers toward said sun roller in such a manner that a first load vector directing from said pressing surface toward any one of said shaft members, and a second load vector directing from the outer peripheral surface of said sun roller toward said one shaft member, intersect with each other at one point within said one shaft member.

8. The traction-drive type driving-force transmission mechanism as defined in claim 7, wherein said first and second load vectors intersect with each other on said second central axis of said one shaft member.

9. The traction-drive type driving-force transmission mechanism as defined in claim 1, wherein each of three components consisting of said sun roller, said speed-reduction roller and said pressing member to be brought into press contact with each other is made of a material having a hardness set to become higher in descending order of surface velocity in respective press contact portions of said components.

10. The traction-drive type driving-force transmission mechanism as defined in claim 1, wherein each of three components consisting of said sun roller, said speed-reduction roller and said pressing member to be brought into press contact with each other is made of a material having a hardness equal to or greater than that of at least die steel, and at least one of said components to be driven at a maximum value of surface velocity in respective press contact portions thereof has a surface subjected to a micro-shot peening treatment.

11. The traction-drive type driving-force transmission mechanism as defined in claim 1, wherein said pressing member and said output shaft are coupled to each other by means of screwing, wherein said output shaft is coupled to said pressing member in such a manner as to be screwed with said pressing member in a direction causing an increase in a screw tightening force in a driven state thereof.

12. The traction-drive type driving-force transmission mechanism as defined in claim 1, which further comprises a driving source adapted to drivingly rotate said sun roller, wherein a drive unit including said driving source and said sun roller, a speed-reduction unit including said plate member, said shaft members and said speed-reduction rollers, and a pressing unit including said pressing member, are assembled together in such a manner as to be separable from each other on a unit-by-unit basis.

13. The traction-drive type driving-force transmission mechanism as defined in claim 12, which further comprises a speed sensing unit adapted to sense a rotational speed of said output shaft, said speed sensing unit being separable relative to said pressing unit.

14. The traction-drive type driving-force transmission mechanism as defined in claim 1, which further comprises:
   a second bearing which rotatably supports said output shaft;
   a bias member disposed between said pressing member and said second bearing to bias said pressing member in a direction causing said pressing member to press each of said speed-reduction rollers; and
   a spacer having one surface in contact with said second bearing, and the other surface in contact with said bias member.

15. The traction-drive type driving-force transmission mechanism as defined in claim 1, which further comprises:
   a slit plate fixed to said output shaft; and
   an optical sensor device adapted to emit and receive light across said slit plate which is being rotated in conjunction with rotation of said output shaft,
   wherein said pressing member and said output shaft are coupled to each other in such a manner as to transmit a torque from said pressing member to said output shaft while allowing said pressing member to be displaced along an axial direction of said output shaft in a direction causing said pressing member to press each of said speed-reduction rollers.

16. The traction-drive type driving-force transmission mechanism as defined in claim 15, which further comprises a clutch adapted to selectively couple between said pressing member and said output shaft, wherein:
   said pressing member has a housing portion capable of receiving therein a part of said output shaft: and
   said clutch is fixedly attached to an inner peripheral surface of said housing portion, and fitted on said output shaft in such a manner as to be slidably moved relative to said output shaft in the axial direction of said output shaft.

17. The traction-drive type driving-force transmission mechanism as defined in claim 15, wherein said pressing member has a housing portion capable of receiving therein a portion of said output shaft, wherein:
   at least said portion of said housing portion is formed with a first linear protrusion or recess extending in the axial direction of the output shaft; and
   said housing portion has an inner wall formed with a second linear recess or protrusion fittingly engageable with said first linear protrusion or recess.

18. The traction-drive type driving-force transmission mechanism as defined in claim 1, which further comprises:
   a bias member which biases said pressing member in a direction causing said pressing member to press each of said speed-reduction rollers;
   a slit plate fixed to said output shaft;
   an optical sensor device adapted to emit and receive light across said slit plate which is being rotated in conjunction with rotation of said output shaft; and
   an adjustment device adapted to adjust a biasing state of said bias member relative to said pressing member,
   wherein:
   said pressing member is fitted onto said output shaft in such a manner as to be displaceable in an axial direction of said output shaft; and
   said adjustment device is adapted, in response to a displacement of said pressing member in an axial direction of said output shaft, to maintain a pressing force of said pressing member relative to each of said speed-reduction rollers at a constant level.

19. An image forming apparatus comprising:
   an image forming section including at least a photosensitive drum, or a photosensitive drum and an intermediate transfer belt;
   a driving source operable to generate a driving force for driving said photosensitive drum, or at least one of said photosensitive drum and said intermediate transfer belt; and
   a traction-drive type driving-force transmission mechanism operable to transmit the driving force of said driving source to a rotary shaft of said photosensitive drum, or a driving member of said intermediate transfer belt, said traction-drive type driving-force transmission mechanism including:
   an output shaft;
   a sun roller having a first central axis and being rotatable about said first central axis;
   a plurality of shaft members having respective second central axes and being disposed respectively on corresponding ones of a plurality of secondary axes each inclined relative to said first central axis by a predetermined angle, in such a manner that each of said second central axes is aligned with said corresponding secondary axis;
   a plate member which holds each of said shaft members in said posture inclined by said predetermined angle;
   a plurality of speed-reduction rollers each disposed along an outer peripheral surface of said sun roller while being supported by a corresponding one of said shaft members; and
   a pressing member coupled to said output shaft, and contacting each of the speed-reduction rollers for directly pressing each of said speed-reduction rollers against the outer peripheral surface of said sun roller to allow a driving force to be transmitted through means of a traction force between said sun roller and each of said speed-reduction rollers.

20. A traction-drive type driving-force transmission mechanism comprising:
   an output shaft;
   a sun roller having a first central axis and being rotatable about said first central axis;

a plurality of shaft members having respective second central axes and being disposed respectively on corresponding ones of a plurality of secondary axes each inclined relative to said first central axis by a predetermined angle, in such a manner that each of said second central axes is aligned with said corresponding secondary axis;

a plate member which holds each of said shaft members in said posture inclined by said predetermined angle;

a plurality of speed-reduction rollers each disposed along an outer peripheral surface of said sun roller while being supported by a corresponding one of said shaft members, each of said speed-reduction rollers being adapted to be slidably moved on said corresponding shaft member; and a pressing member coupled to said output shaft, and adapted to press each of said speed-reduction rollers against the outer peripheral surface of said sun roller to allow a driving force to be transmitted through means of a traction force between said sun roller and said speed-reduction roller.

21. The traction-drive type driving-force transmission mechanism as defined in claim 20, which further comprises a plurality of first bearings each supporting a respective one of said speed-reduction rollers rotatably about said corresponding shaft member, each of said first bearings being adapted, when a pressing force is applied from said pressing member to said speed-reduction roller, to be moved on said corresponding shaft member along said corresponding secondary axis together with said speed-reduction roller.

22. The traction-drive type driving-force transmission mechanism as defined in claim 21, which further comprises a bias member which biases said pressing member in a direction causing said pressing member to come closer to each of said speed-reduction rollers, wherein:

said pressing member has a pressing surface adapted to press each of said speed-reduction rollers toward said sun roller; and each of said speed-reduction rollers has a pressure-receiving surface adapted to be pressed by said pressing surface, each of said speed-reduction rollers being adapted, when said pressure-receiving surface is pressed by said pressing surface of said biased pressing member, to be infinitesimally moved on said shaft member thereof.

23. A traction-drive type driving-force transmission mechanism, comprising:

an output shaft;

a sun roller having a first central axis and being rotatable about said first central axis;

a plurality of shaft members having respective second central axes and being disposed respectively on corresponding ones of a plurality of secondary axes each inclined relative to said first central axis by a predetermined angle, in such a manner that each of said second central axes is aligned with said corresponding secondary axis;

a plate member which holds each of said shaft members in said posture inclined by said predetermined angle;

a plurality of speed-reduction rollers each disposed along an outer peripheral surface of said sun roller while being supported by a corresponding one of said shaft members; and a pressing member coupled to said output shaft and adapted to press each of said speed-reduction rollers against the outer peripheral surface of said sun roller to allow a driving force to be transmitted through means of a traction force between said sun roller and said speed-reduction roller, wherein said pressing member and said output shaft are coupled to each other by means of screwing, wherein said output shaft is coupled to said pressing member in such a manner as to be screwed with said pressing member in a direction causing an increase in a screw tightening force in a driven state thereof.

* * * * *